United States Patent
Sakurai

(10) Patent No.: US 8,189,206 B2
(45) Date of Patent: May 29, 2012

(54) PRINT CONTROL APPARATUS, PRINTING SYSTEM, PRINT CONTROL METHOD, AND COMPUTER-READABLE STORAGE MEDIUM

(75) Inventor: Masakatsu Sakurai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 12/437,376

(22) Filed: May 7, 2009

(65) Prior Publication Data

US 2009/0279114 A1 Nov. 12, 2009

(51) Int. Cl.
*B65H 5/22* (2006.01)
*G06K 15/00* (2006.01)
(52) U.S. Cl. ........... 358/1.12; 358/1.14; 271/3.01
(58) Field of Classification Search ............ 399/382, 399/16, 364, 403, 404, 407; 358/1.15, 1.6, 358/1.14
See application file for complete search history.

(56) References Cited

U.S. PATENT DOCUMENTS

| | | | | |
|---|---|---|---|---|
| 6,442,368 | B1 * | 8/2002 | Ohtsuka et al. | 399/382 |
| 7,567,354 | B2 * | 7/2009 | Shirai | 358/1.12 |
| 8,066,279 | B2 * | 11/2011 | Ishikawa et al. | 271/228 |
| 2005/0251286 | A1 * | 11/2005 | Yasui | 700/230 |
| 2009/0230613 | A1 * | 9/2009 | Kuno | 271/176 |

FOREIGN PATENT DOCUMENTS

| | | | |
|---|---|---|---|
| JP | 2004-045964 A | | 2/2004 |
| JP | 2005231773 | * | 9/2005 |
| JP | 2007-060097 A | | 3/2007 |

* cited by examiner

*Primary Examiner* — Jerome Grant, II
(74) *Attorney, Agent, or Firm* — Canon U.S.A., Inc. IP Division

(57) ABSTRACT

A print control apparatus controls a color multifunction printer (MFP) having a print unit and a paper ejecting unit, and a post-press section including a nearline finisher having a feeding unit and a post processing unit and including a post-press server controlling the finisher. The print control apparatus performs control as follows: The print unit is controlled to print content included in a job together with a job ticket and to print information included in the job ticket on the upper surface thereof. The paper ejecting unit is controlled to eject the job ticket using a determined paper ejection method so as to be placed on top of the printed media on which the content has been printed, in a state in which the printed media are stacked.

17 Claims, 17 Drawing Sheets

PRINT CONTROL APPARATUS, PRINTING SYSTEM, PRINT CONTROL METHOD, AND COMPUTER-READABLE STORAGE MEDIUM

BACKGROUND OF THE INVENTION

1. Field of the Invention

The present invention relates to an image forming apparatus, a finisher apparatus, a print control apparatus that is capable of controlling the finisher apparatus, a printing system including these apparatuses, a print control method, and a computer-readable storage medium storing a program.

2. Description of the Related Art

In existing printing systems such as print on demand (POD) systems, a job ticket is printed and ejected by a printer together with the content included in the job when the printer and a nearline finisher operate cooperatively in a nearline manner. An operator will perform paper feeding and paper ejecting operations on the basis of the content of the job ticket. In such a nearline cooperative operation, the paper feeding method of the nearline finisher is fixed, and hence, the printer has to eject paper using a paper ejection method that matches the paper feeding method supported by the nearline finisher. There are two paper ejection methods; one is a face-down ejection method where paper is ejected with the printed surface facing down, the other is a face-up ejection method where paper is ejected with the printed face facing up.

In such a printing system where printing and finishing processes are performed by separate apparatuses, an operator has to determine whether or not a finishing process needs to be additionally performed for the printed media printed by a printer. Hence there is a problem in which a possible human error may prevent a desired output based on correct processing from being obtained.

Japanese Patent Laid-Open No. 2007-60097 discloses an example technology that prevents such a human error from occurring. In this technology, in order to allow an operator to know what necessary operation is to be performed for printed media, a printer attaches a banner page and displays a manipulation menu, thereby notifying the operator of the appropriate processing to be performed for a print job.

A generally used method is to print, together with the content of a job, a job ticket, which describes operation instructions showing what finishing process is to be performed for the printed media. However, there is a problem in which the job ticket printed by a printer is ejected beneath the printed media in the case of face-down printing, thus making the job ticket difficult to access for the operator.

SUMMARY OF THE INVENTION

The present invention addresses such problems as described above, and provides a system in which an operator can reliably obtain a job ticket irrespective of the paper ejection method of a printer.

The present invention provides a print control apparatus that controls an image forming apparatus and a post-press section. The image forming apparatus includes a print unit configured to perform printing and a paper ejecting unit configured to eject printed media printed by the print unit, and the post-press section includes a finisher apparatus and a finisher control apparatus that controls the finisher apparatus, the finisher apparatus including a paper feeding unit configured to feed printed media and a post processing unit configured to perform post processing on the printed media fed by the feeding unit. The print control apparatus includes an obtaining unit configured to obtain capability information showing a paper feeding method supported by the paper feeding unit of the finisher apparatus; determination unit configured to determine a paper ejection method of the paper ejecting unit of the image forming apparatus on the basis of the capability information obtained by the obtaining unit; and a control unit configured to control the print unit of the image forming apparatus such that content included in a job is printed together with a job ticket of the job that includes information regarding the job, and configured to control the paper ejecting unit of the image forming apparatus such that paper is ejected using the paper ejection method determined by the determination unit. The control unit controls the print unit of the image forming apparatus such that the information regarding the job is printed on the upper surface of the job ticket and controls the paper ejecting unit of the image forming apparatus such that, in a state in which the printed media are stacked, the job ticket is ejected so as to be placed on top of the printed media on which the content has been printed.

The present invention allows an operator to reliably obtain a job ticket, leading to a decrease in human error in which a wrong operation is performed due to loss of a job ticket.

Further features of the present invention will become apparent from the following description of exemplary embodiments with reference to the attached drawings.

DESCRIPTION OF THE EMBODIMENTS

Figure 1:
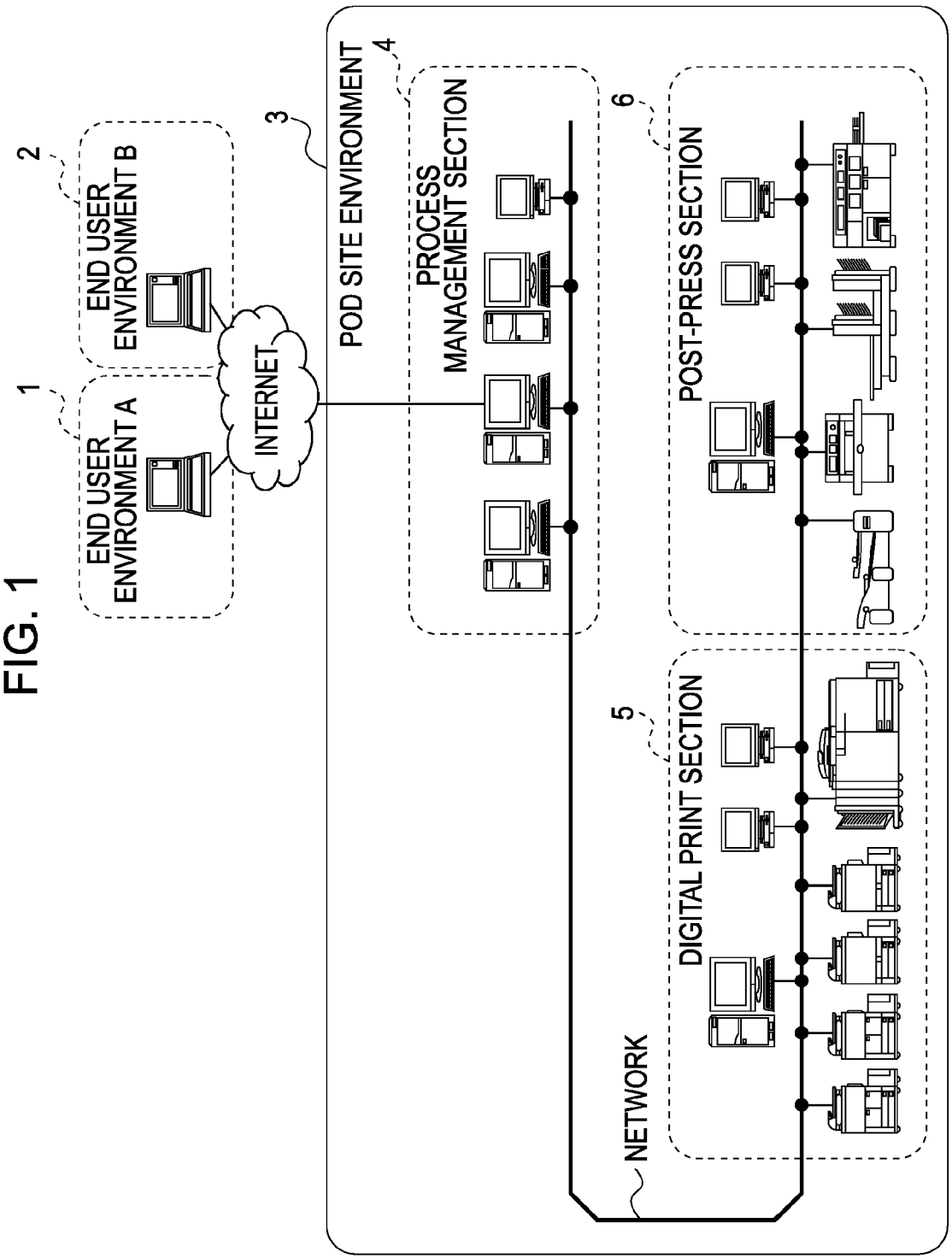
FIG. 1 is a block diagram showing an example configuration of a printing system.

FIG. 1 is a block diagram showing an example of the general basic configuration of a printing system to which an embodiment of the present invention is applied. The block diagram shown in FIG. 1 includes one or more end user environments, in FIG. 1 end user environments 1 and 2, and a POD site environment 3 connected via the Internet.

In the end user environments 1 and 2, there are orderers who make a print request. Each of the orderers submits a print request job from the respective user environment (a user environment A1 or B2, in this case) via the Internet to the POD site environment 3.

The POD site environment 3 generally includes a process management section 4, a digital print section 5, and a post-press section 6.

The process management section 4 provides an operation instruction for each operation step of the digital print section 5 and the post-press section 6 in the POD site environment 3, thereby performing central workflow management of the system including computers and various devices. The process management section 4 receives a job from the end user environment 1 or 2 and stores it. In addition, the process management section 4 schedules efficient operations for each device and each operator by assembling operations for each step as a workflow, on the basis of the instructions given in the job.

The digital print section 5, in accordance with the operation instructions of the job received from the process management section 4, copies a paper document received from the end user environment 1 or 2, using a monochrome multifunction printer (MFP), a color MFP, or the like. In addition, the digital print section 5 prints a document/image file received from the end user environment 1 or 2, a scanned image file scanned with a scanning device, or a document/image file obtained by editing these files, using a printer such as a monochrome MFP or a color MFP.

The post-press section 6 supplements the capabilities or functions of a finisher that is connected to a monochrome or color MFP of the digital print section 5 when these capabilities or functions are insufficient. The post-press section 6, in accordance with the operation instructions of the job received from the process management section 4 or the digital print section 5, also controls the finisher which may be a paper folding machine, a saddle stitching machine, a case binding machine, a trimmer, an enclosing machine, or a paper collator. In addition, the post-press section 6 performs a finishing process such as paper folding, saddle stitching, case binding, trimming, enclosing, or collating, on the printed media ejected from the digital print section 5.

Figure 2:
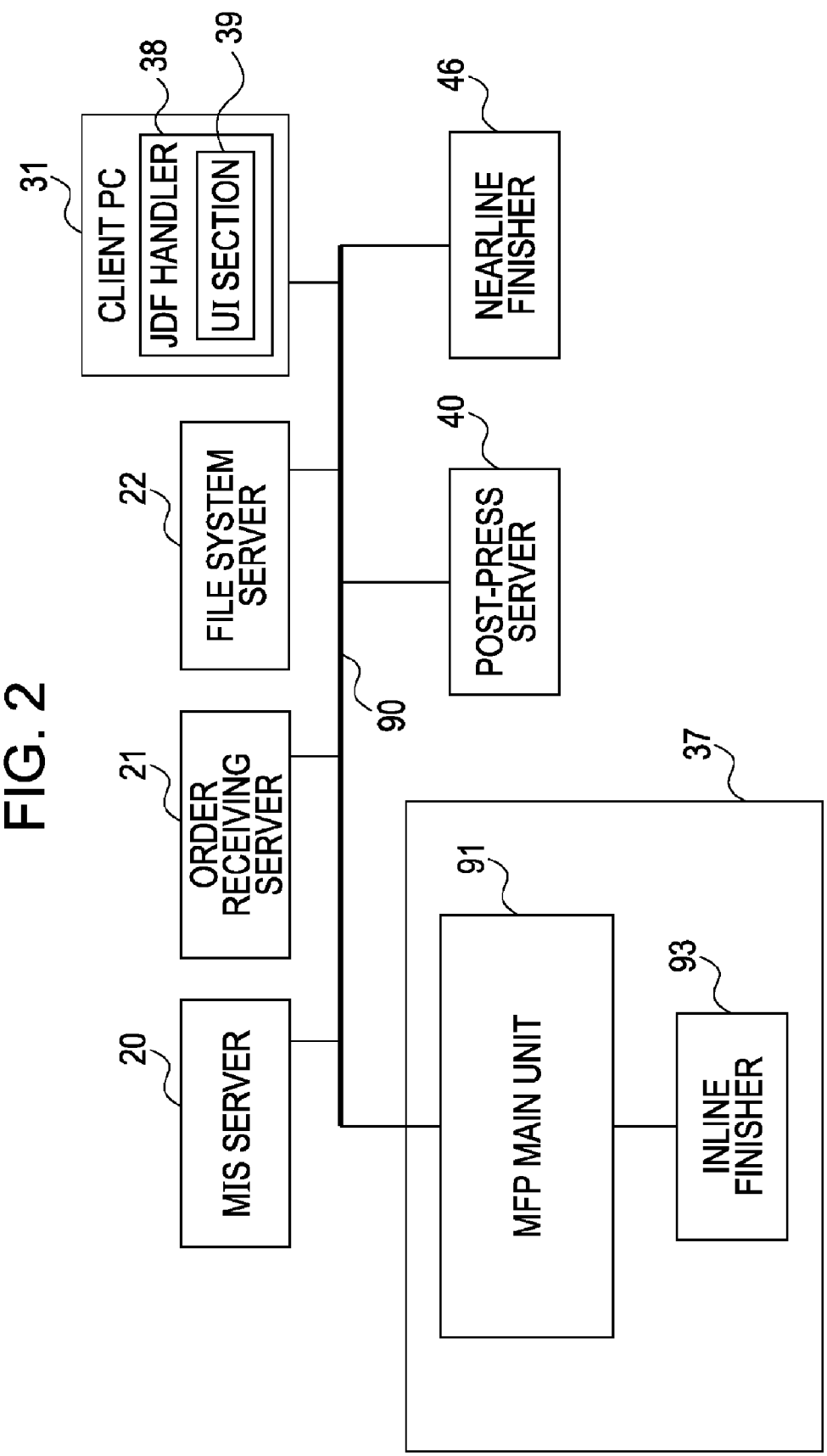
FIG. 2 is a block diagram showing an example configuration of the printing system according to a first embodiment of the present invention.

FIG. 2 is another block diagram showing an example of the general basic configuration of the printing system according to an embodiment of the present invention. FIG. 2 shows only a portion of the general basic configuration of the printing system shown in FIG. 1 which is necessary for explaining the present embodiment of the invention. Hereinafter, the embodiments are described referring to FIG. 2.

In the present embodiment, the process management section 4 of the printing system includes an MIS server 20, an order receiving server 21 and a file system server 22. The digital print section 5 includes a color MFP 37 and a client PC 31. The color MFP 37 includes an MFP main unit 91 that performs processing from receipt of a job to ejection of printed media in accordance with the information described in the job, and an inline finisher 93 that is connected as a conveying path for the printed media output from the MFP main unit 91.

The client PC 31 includes a JDF handler 38 and a UI section 39. The JDF handler 38 is software that controls the whole printing system. The JDF handler 38 sends/receives a JDF job (hereinafter simply called a job) to/from the MIS server 20 and a post-press server 40, and notifies these servers of the job status. The JDF handler 38 also obtains status information that includes the capability information of a nearline finisher 46. In addition, the JDF handler 38, analyzing a job received from the MIS server 20, instructs the MFP main unit 91 to perform printing and the post-press server 40 to perform a finishing process. The UI section 39 provides a user interface that is used for receiving user-input information when a CPU 101 processes a job using the JDF handler 38. Hereinafter, a user interface is also called a UI. The post-press section 6 includes the post-press server 40 and the nearline finisher 46, which is a case binder machine.

The post-press server 40 sends status information including capability information of each device within the post-press section 6 to the MIS server 20 and the client PC 31, and receives a job from the client PC 31. In addition, the post-press server 40 confirms whether the finishing process instructed by the client PC 31 matches the finishing process that can be performed by the nearline finisher 46 when the nearline finisher 46 receives printed media as an input.

Reference numeral 90 denotes a network such as a local area network (LAN), which connects devices such as the MIS server 20, the color MFP 37, and the post-press server 40 to one another.

The MIS server 20 manages the workflow of the whole system, from receipt of a job to a finishing process. Specifically, the workflow management deals with the following processing. A job received by the order receiving server 21 is sent to the MIS server 20, which records the received job. The MIS server 20 has a function of schedule management of the job processing in the whole printing system, and manages the recorded job as a job to be processed in the printing system together with its processing schedule. Furthermore, the MIS server 20 instructs the color MFP 37 to start the processing of the job in accordance with the processing schedule, and receives the current processing status information from the color MFP 37. Then, the MIS server 20, when receiving an end-of-job notification from the color MFP 37, sends a job to the post-press server 40 instructing the post-press server 40 to perform a finishing process for the printed media printed by the color MFP 37. The MIS server 20 receives status information of the finishing process and a notification of the end of the finishing process from the post-press server 40. In addition, the MIS server 20 notifies an operator of the various received information via a cathode ray tube (CRT) connected to the MIS server 20 and the UI section 39 of the client PC 31.

Figure 3:
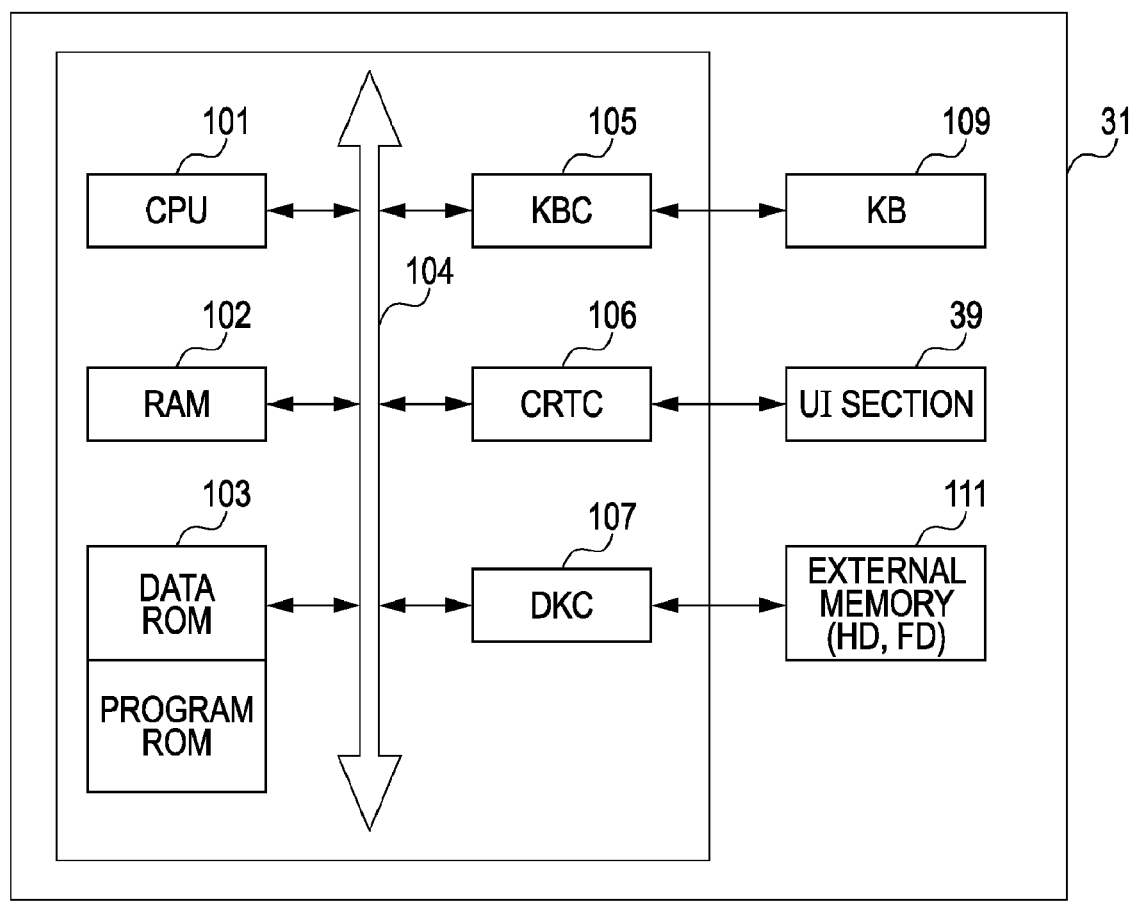
FIG. 3 is a block diagram showing a configuration of a client PC according to the first embodiment.

FIG. 3 is a block diagram showing a configuration of the client PC 31 shown in FIG. 2. The CPU 101 reads and executes a program stored in a read only memory (ROM) 103. A random access memory (RAM) 102 functions as the main memory and work area of the CPU 101. The ROM 103 is a computer-readable storage medium that stores data, programs, and the like. A keyboard controller (KBC) 105 controls input from a keyboard 109 and a pointing device (not shown). A CRT controller (CRTC) 106 controls the display of the UI section 39. A disk controller (DKC) 107 controls accessing of an external memory 111. The CPU 101 reads in and executes a program stored in the ROM 103, whereby the JDF handler 38 operates and controls the printing system.

Figure 4:
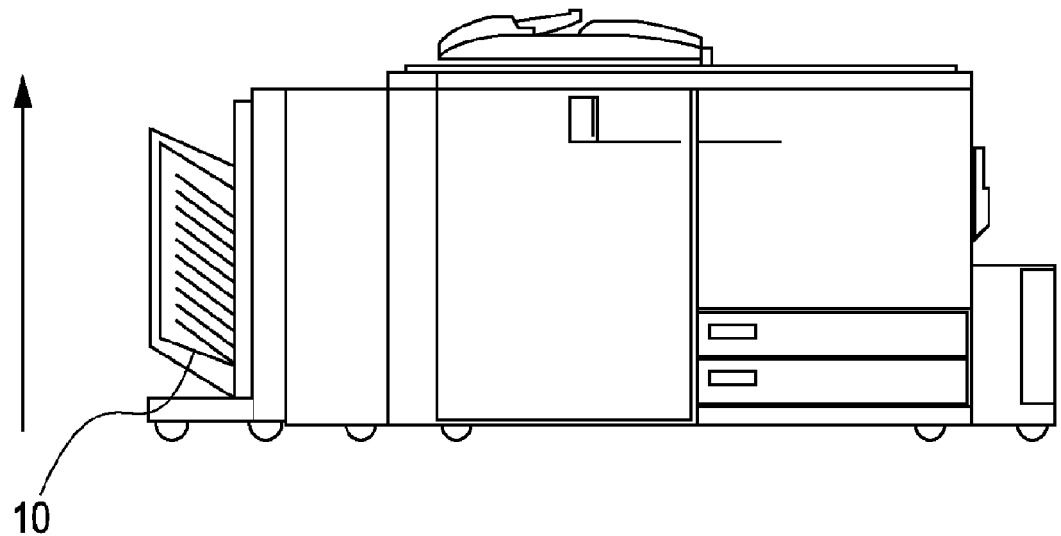
FIG. 4 is an exterior view of a color multifunction printer (MFP) 37.
Figure 5:
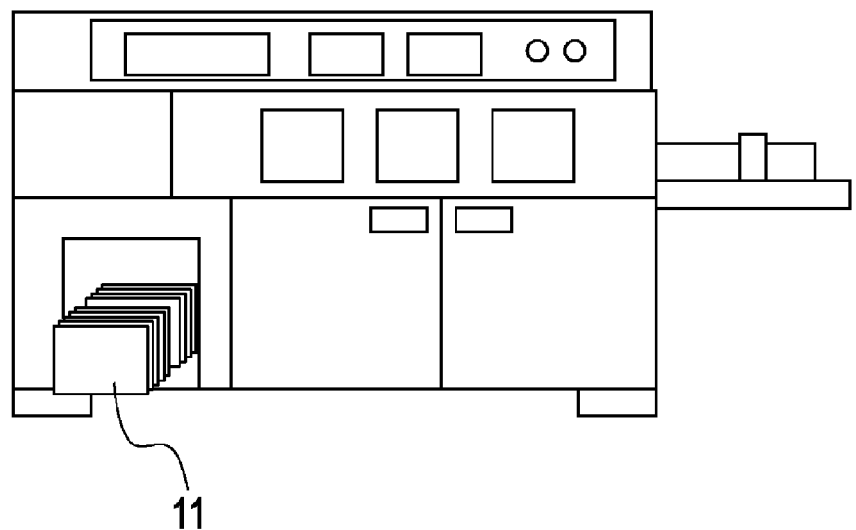
FIG. 5 is an exterior view of a nearline finisher 46.

Referring to FIGS. 4 and 5, paper ejection and paper feeding according to the present embodiment will now be described.

FIG. 4 shows an exterior view of the color MFP 37. The printed media printed by a print unit of the color MFP 37 is ejected by a paper ejecting unit 10. In the present specification, it is defined that an arrow in FIG. 4 points in an upward direction. In a state where printed media are ejected from the paper ejecting unit 10 and, hence, a plurality of sheets are stacked, an uppermost medium of the printed media is defined to be the uppermost portion of the printed media, and the lowermost medium of the printed media is defined to be the lowermost portion of the printed media. Likewise, a surface of the printed medium facing upward is defined to be an upper surface, and a surface facing downward is defined to be a lower surface. Note that the front surface of the printed medium is different from the upper surface of the printed medium. When the printed media are ejected using a face-down ejection method, for example, the back surface is the upper surface.

FIG. 5 is an exterior view of the nearline finisher 46, where reference numeral 11 denotes a paper feeding unit. The printed media fed by the paper feeding unit 11 undergoes a finishing process performed by a post processing unit of the nearline finisher 46.

Data structures handled in the printing system according to embodiments of the present invention will now be described.

Figure 6:
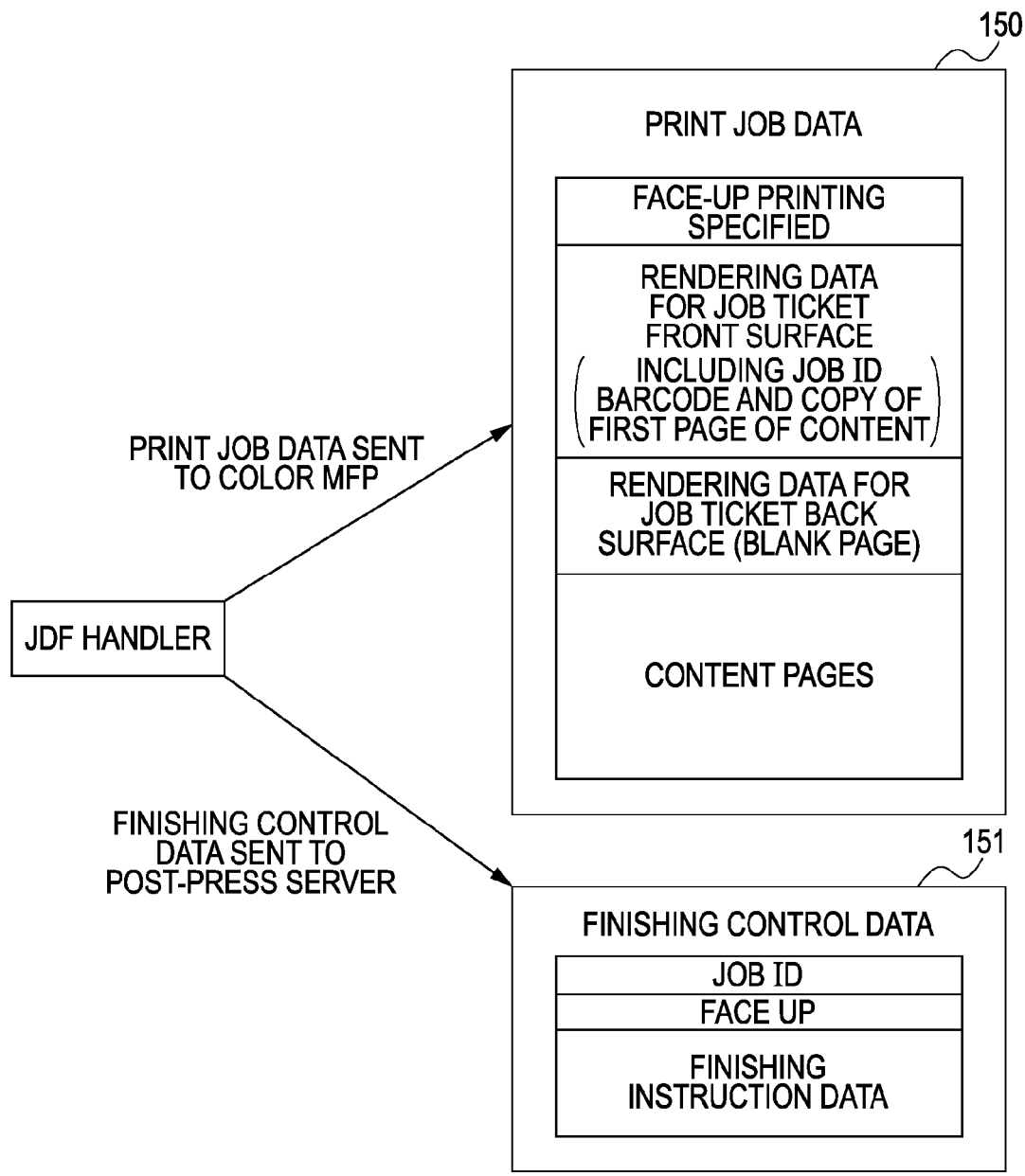
FIG. 6 is a diagram illustrating example data structures of print job data and finishing control data for a case of a face-up paper ejection method according to the first embodiment.

First, a data structure for the case in which the paper ejection method of the color MFP 37 is a face-up ejection method will be described. FIG. 6 shows example data structures of print job data and finishing control data for the case of the face-up paper ejection method. The CPU 101 generates, and sends to the color MFP 37, print job data 150 on the basis of a received job, using the JDF handler 38. Likewise, the CPU 101 generates, and sends to the post-press server 40, finishing control data 151 on the basis of the received job, using the JDF handler 38.

The print job data 150 for the case of the face-up paper ejection method includes a code specifying face-up printing, rendering data for the front surface of a job ticket, rendering data for the back surface of the job ticket, and content page data, in. this sequence. Here, face-up printing means that printed media printed by the print unit are ejected face-up in the paper ejecting unit 10. The rendering data for the front surface of the job ticket includes data for rendering a barcode representing ID information used for identifying the job, and a copy of the rendering data of the first page of the content pages.

The rendering data for the back surface of a job ticket represents a blank page. The content pages that will undergo a finishing process are arranged so as to follow the rendering data for the job ticket.

Each page is capable of specifying the kind of sheet to be used for printing. Usually, a job ticket page specifies a sheet used only for a job ticket that is different from sheets used for the content pages. The finishing control data 151 includes ID information, information regarding the paper ejection method used in the color MFP 37 (showing the face-up ejection method), and data specifying the details of a finishing process to be performed in the nearline finisher 46. Here, the ID information is used to identify a job. The post-press server 40, having received the finishing control data 151, holds the data until the printed media are actually input. At the time of the input of the printed media, the nearline finisher 46 confirms input of the printed media and performs a finishing process on the basis of the held data.

Figure 7:
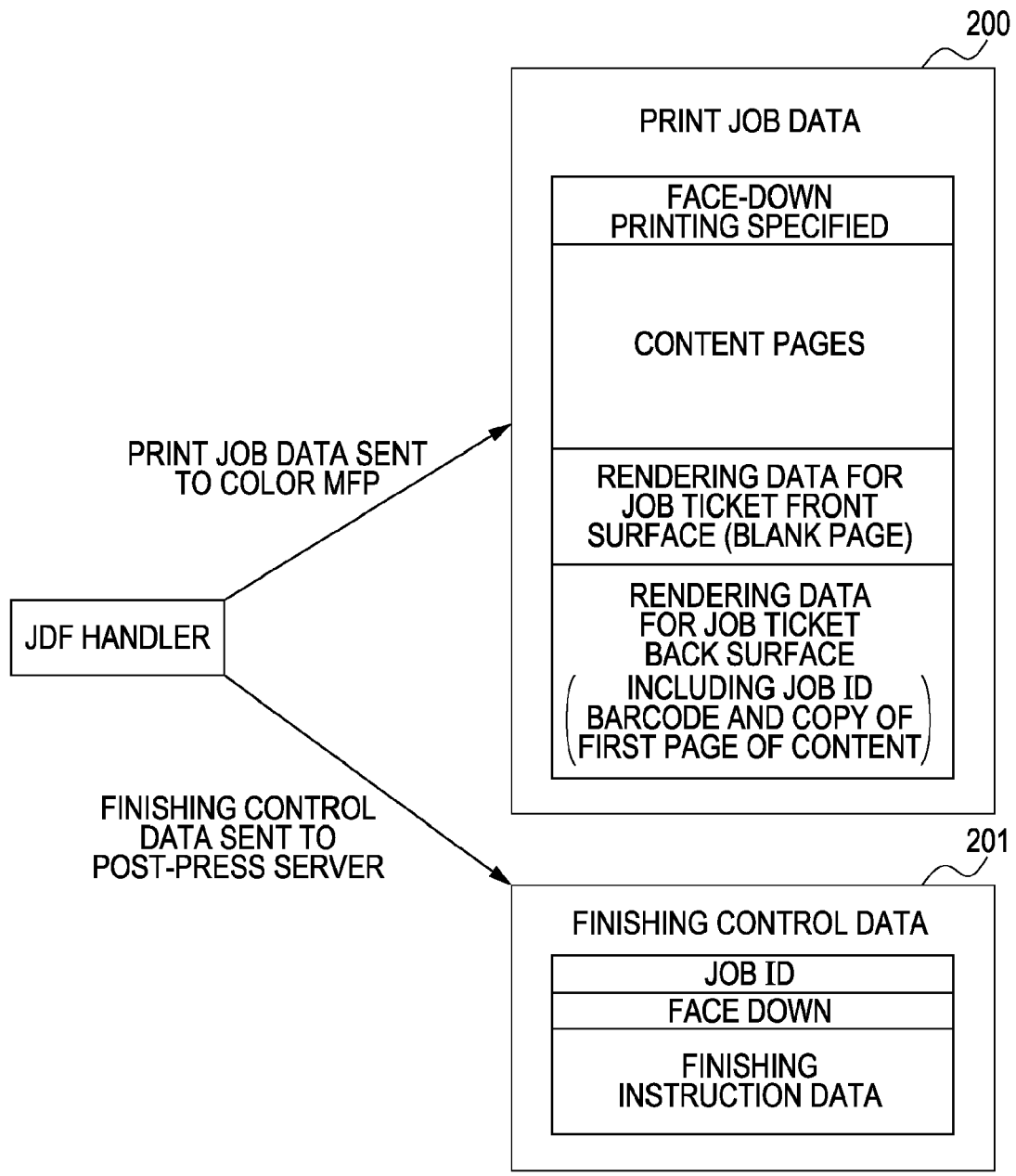
FIG. 7 is a diagram for explaining example data structures of print job data and finishing control data for a case of a face-down paper ejection method according to the first embodiment.

Next, a data structure for the case in which the paper ejection method of the color MFP 37 is a face-down ejection method will be described. FIG. 7 shows example data structures of print job data 200 and finishing control data 201 for the case of the face-down paper ejection method. The CPU 101 generates print job data 200 on the basis of a received job, using the JDF handler 38, and sends it to the color MFP 37. Likewise, the CPU 101 generates finishing control data 201 on the basis of the received job, using the JDF handler 38, and sends it to the post-press server 40.

The print job data 200 for the case of the face-down ejection method includes a code specifying face-down printing, and content page data, rendering data for the front surface of a job ticket, rendering data for the back surface of the job ticket, in this sequence. Here, face-down printing means that printed media printed by the print unit are ejected face down in the paper ejecting unit 10. The rendering data for the front surface of the job ticket represents a blank page.

The rendering data for the back surface of the job ticket includes data for rendering a barcode representing ID information used for identifying a job, and a copy of the rendering data of the first page of the content pages. When the paper ejection method is the face-down ejection method, the rendering data for the job ticket is arranged so as to follow the content pages that undergo a finishing process. Furthermore, the rendering data for the job ID and the like is arranged on the back surface of the job ticket so that a surface, on which the job ticket information including the job ID is printed, is placed at the top of the ejected printed media with the surface facing up.

In addition, each page is capable of specifying the kind of sheet used for printing. Usually, a job ticket page specifies a sheet used only for a job ticket that is different from sheets used for the content pages.

The finishing control data 201 includes a job, ID information, information regarding the paper ejection method used in the color MFP 37 (showing the face-down ejection method), and data specifying the details of a finishing process to be performed in the nearline finisher 46. The post-press server 40, receiving the finishing control data 201, holds the data until the printed media are actually input. At the time of the input of the printed media, the nearline finisher 46 confirms input of the printed media and performs a finishing process on the basis of the held data.

Figure 8:
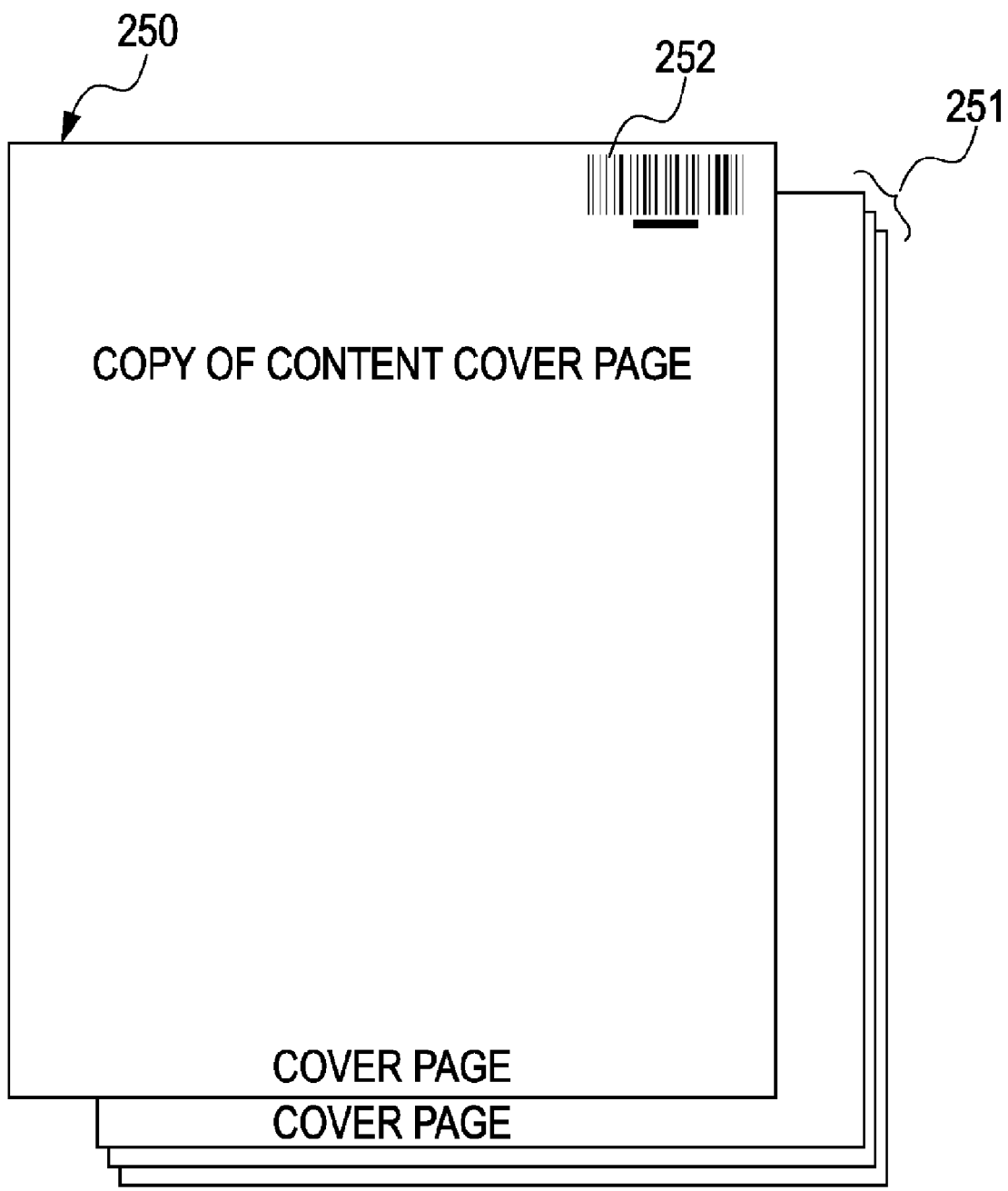
FIG. 8 is a diagram for explaining an example job ticket having the ID of a job according to the first embodiment.

The job ticket according to the present embodiment will now be described in detail. FIG. 8 shows an example job ticket 250 having the ID of a job according to the present embodiment. The job ticket 250 is ejected as the uppermost page of the stacked printed media. Content pages 251 follow underneath the job ticket 250.

The job ticket 250 includes a copy of the first page of the content pages 251 and a barcode 252, printed at the top end thereof, showing the ID information of a job. The job ticket 250 shown in FIG. 8 is an example for the case in which the paper ejection method of the color MFP 37 is the face-up ejection method. Hence, the first page (cover page in this case) of the content pages 251 is printed immediately following the job ticket 250. When the paper ejection method of the color MFP 37 is the face-down ejection method, the cover page of the content pages 251 is ejected as the bottom page of the stacked printed media, since the content pages 251 are sorted in a reverse order. Also in this case, the job ticket 250 is ejected as the uppermost page of the stacked printed media.

A barcode is used to show the ID information of a job in the present embodiment; however, not limited to a barcode, any method capable of adding information to a paper medium such as quick response (QR) Code and low visibility barcode (LVBC) may be used.

Figure 9:
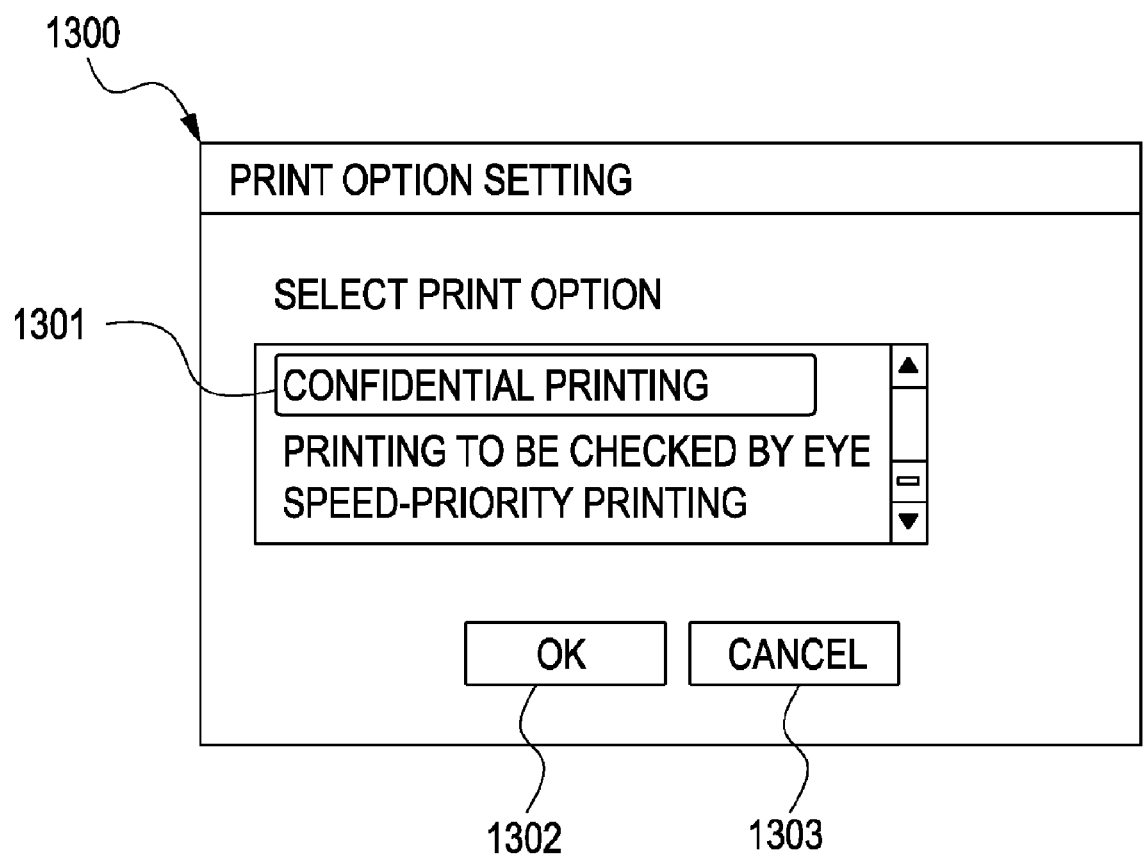
FIG. 9 is a diagram for explaining an example user interface (UI) for selecting a print option according to the first embodiment.

A setting screen for setting a print option will now be described. FIG. 9 is an explanatory diagram showing an example selection screen for selecting the print option that is displayed by the UI section 39 described later in the flowchart shown in FIG. 11. When the nearline finisher 46 supports both face-up and face-down paper feeding methods, the CPU 101 sets the print option using the JDF handler 38, on the basis of the print option that has been selected in a selection screen 1300 and received by the UI section 39. The CPU 101, via the JDF handler 38, determines the paper ejection method of the color MFP 37 in accordance with the set print option. In the present embodiment, confidential printing, printing to be checked by eye, and speed-priority printing are provided as the settable print options. Confidential printing is selected when confidential content is to undergo a finishing process avoiding public exposure. Printing to be checked by eye is selected when allowing an operator to check the printout of the content by eye one by one. Speed-priority printing is selected when shortening printing time is the highest priority. For instance, when an OK button 1302 is pressed while a selection cursor 1301 is pointing to "confidential printing", the UI section 39 receives the selection, and the CPU 101, via the JDF handler 38, sets the print option to confidential printing on the basis of the received print option.

Figure 10:
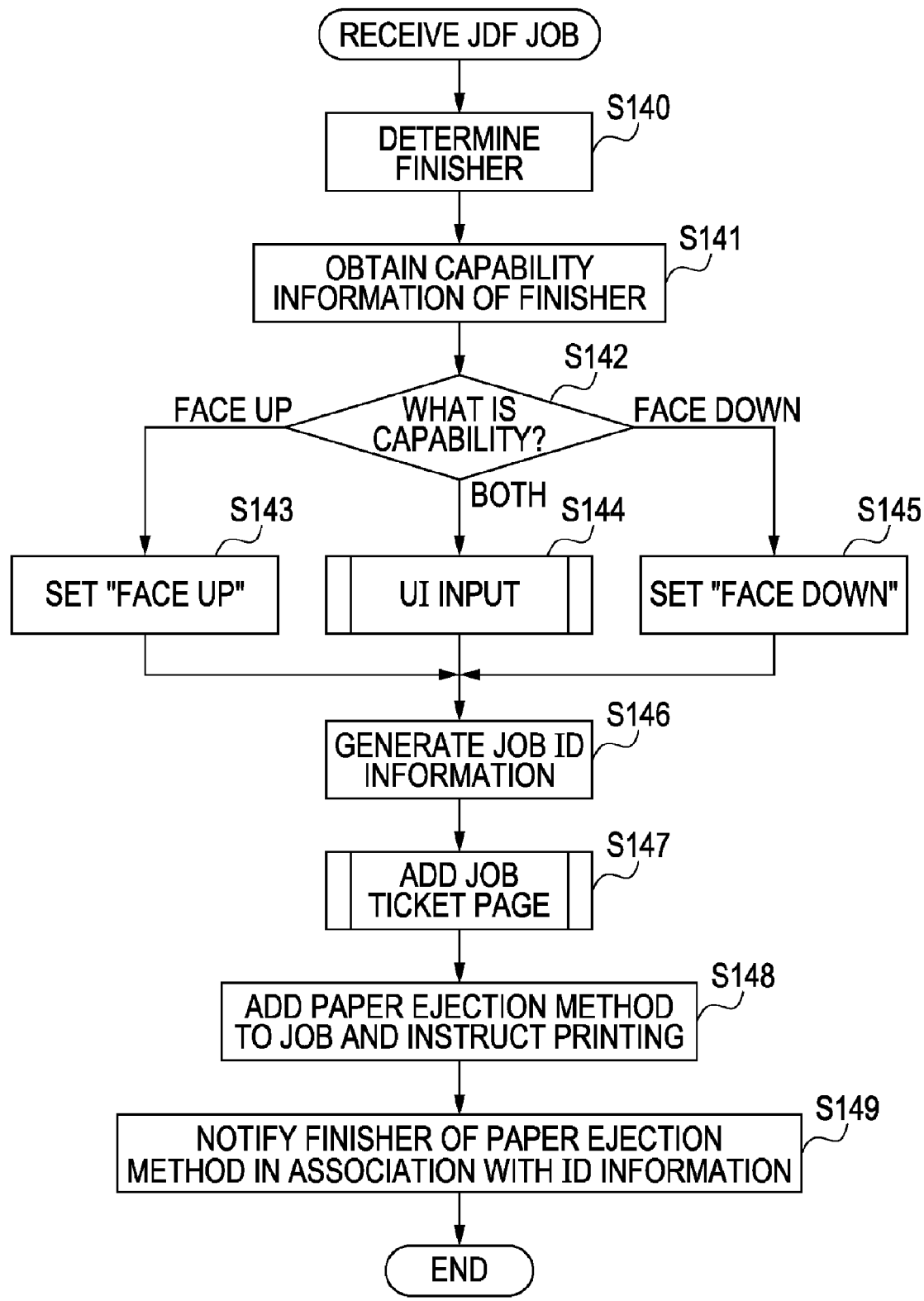
FIG. 10 a first flowchart for explaining processing according to the first embodiment.
Figure 11:
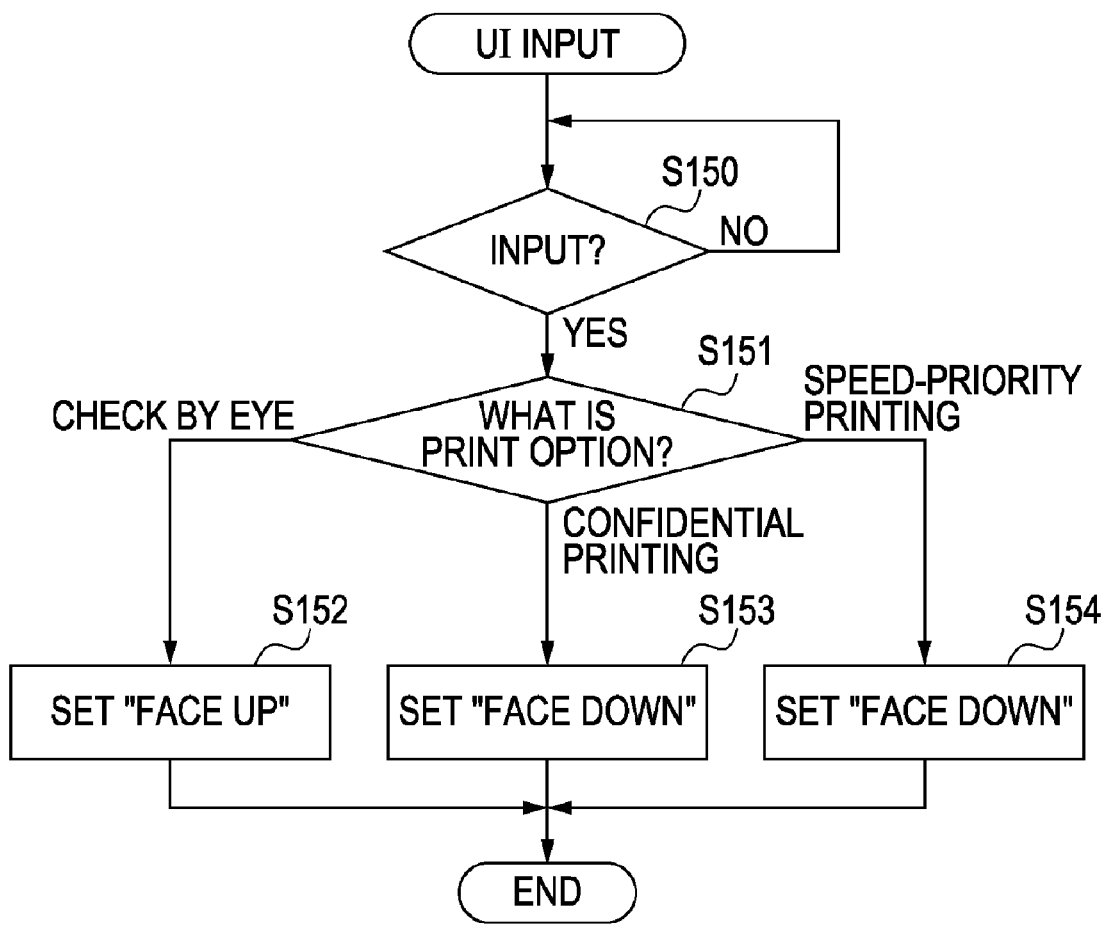
FIG. 11 is a second flowchart for explaining processing according to the first embodiment.
Figure 12:
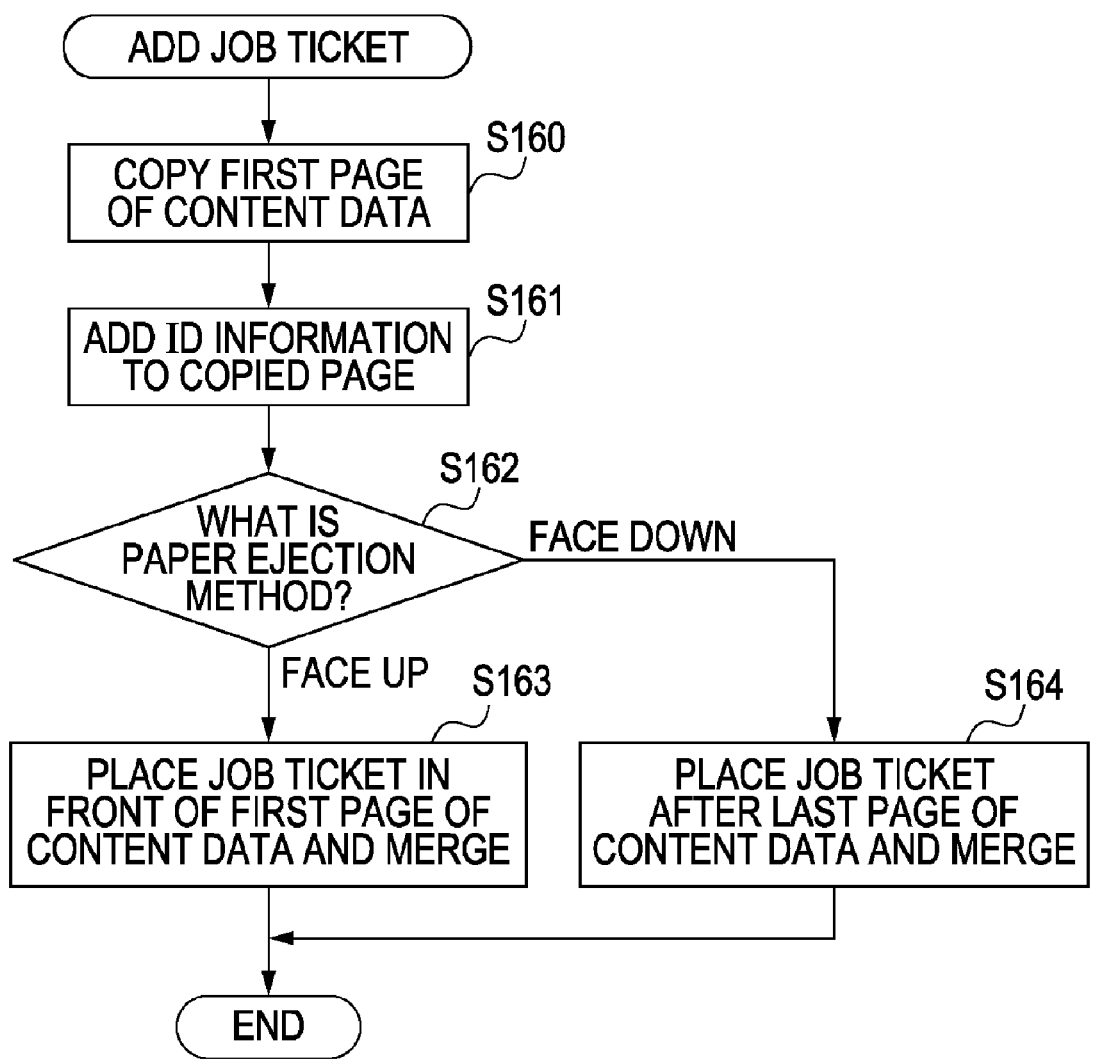
FIG. 12 is a third flowchart for explaining processing according to the first embodiment.
Figure 13:
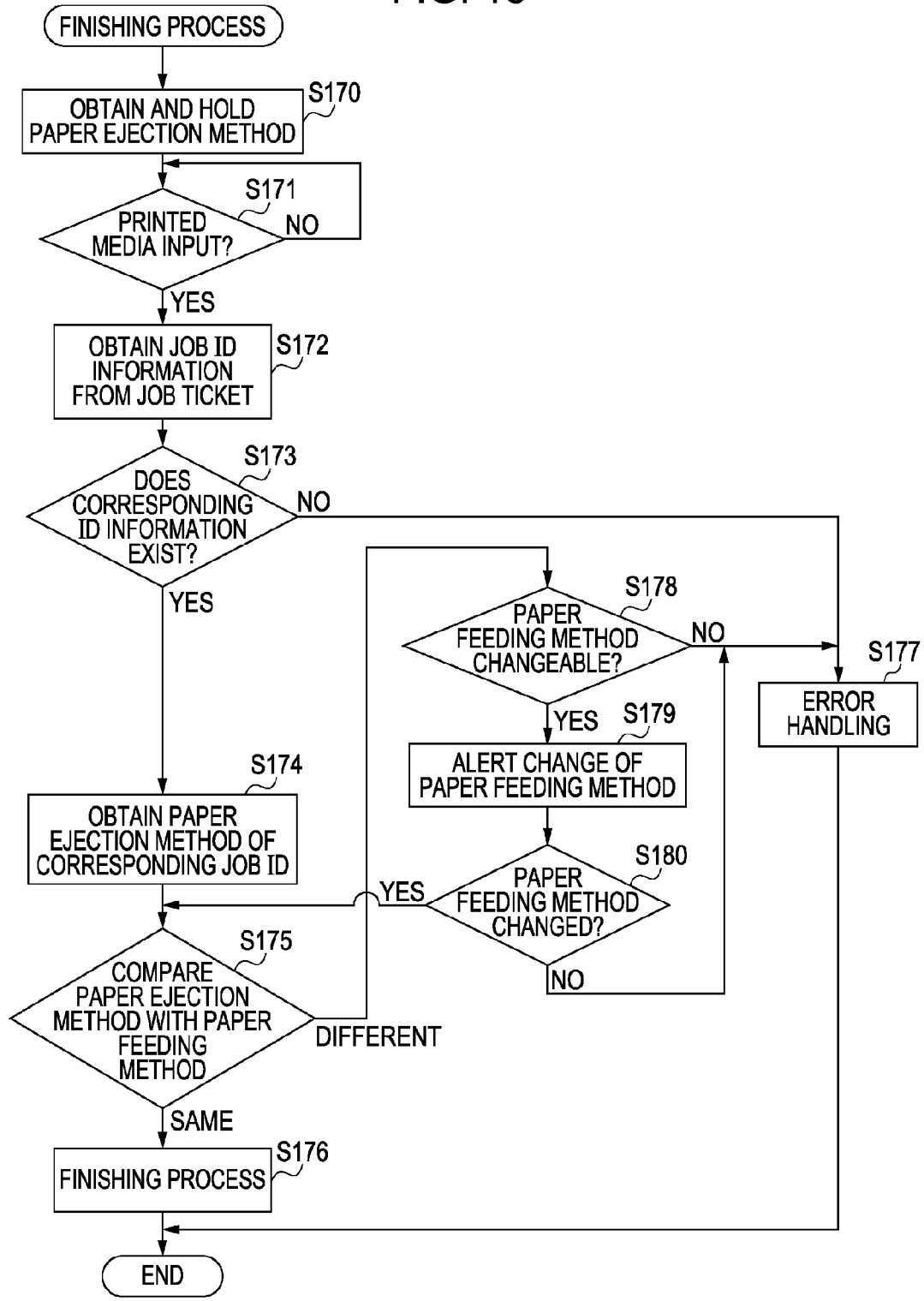
FIG. 13 is a fourth flowchart for explaining processing according to the first embodiment.

Referring to FIGS. 10 to 13, the operation of the present embodiment will now be described. The flows of steps of flowcharts shown in FIGS. 10 to 12 are realized in such a manner that the CPU 101 reads and executes a program stored in the ROM 103 and causes the JDF handler 38 to operate. The flow of steps of a flowchart shown in FIG. 13 is realized in such a manner that a CPU of the post-press server 40, having a configuration similar to that shown in FIG. 3, reads and executes a program stored in a ROM of the post-press server 40.

FIG. 10 is a flowchart showing the process in which the CPU 101, using the JDF handler 38, determines the paper ejection method and notifies the post-press server 40 of the determination result.

In step S140, when the client PC 31 receives a job from the MIS server 20, the CPU 101 determines that the nearline finisher 46 is the finisher to be used on the basis of information received from the post-press server 40, which the CPU 101 asked for in accordance with the finishing process specified by the job.

In step S141, the CPU 101 obtains, via the post-press server 40, capability information showing the paper feeding methods supported by the nearline finisher 46, which has been identified in step S140. Alternatively, by storing a table showing the paper feeding methods supported by the nearline finisher 46 in the ROM 103 of the client PC 31 in advance, the CPU 101 may access the table and obtain the capability information.

In step S142, the CPU 101 determines the capability shown in the received information. When it is determined that the nearline finisher 46 supports only the face-up paper feeding method, the flow proceeds to step S143. In step S143, the CPU 101 determines that the paper ejection method of the color MFP 37 should be the face-up ejection method, and stores the determined paper ejection method in the ROM 103.

When it is determined that the nearline finisher 46 supports both face-up and face-down paper feeding methods in step S142, the flow proceeds to step S144.

In step S144, the UI section 39 stores in the ROM 103 the paper ejection method of the color MFP 37 that has been determined by the CPU 101 on the basis of the input information entered at the selection screen 1300 regarding the print options. Alternatively, the print option may be set in advance.

When it is determined in step S142 that the nearline finisher 46 supports only the face-down paper feeding method, the flow proceeds to step S145. Then, the CPU 101 determines that the paper ejection method of the color MFP 37 is the face-down ejection method, and stores the determined paper ejection method in the ROM 103.

In step S146, the CPU 101 generates the ID information of the job. In the present embodiment, the ID is a sequential number obtained by adding 1 to the ID of the immediately previous print job performed.

In step S147, the process of adding a job ticket is performed, as will be described later using a flowchart shown in FIG. 12.

In step S148, the CPU 101 makes the determined paper ejection method of the color MFP 37 be included in the print job data, and performs control such that the print unit of the color MFP 37 performs printing and the paper ejecting unit 10 ejects paper using the determined paper ejection method.

In step S149, the CPU 101 notifies the post-press server 40 of the determined paper ejection method of the color MFP 37 in association with the generated job ID.

Notifying, thus, the post-press server 40 of the paper ejection method of the color MFP 37, favorably allows the nearline finisher 46 to determine the paper feeding method on the basis of the notified paper ejection method.

FIG. 11 is a flowchart for explaining the process performed by the UI section 39 in step S144 shown in FIG. 10, i.e., the process based on an input entered at the selection screen 1300 regarding the print options, as described in FIG. 9.

In step S150, the UI section 39 waits for an input from an operator when it sets a print option. A waiting state continues while no input is received. When an input is entered, the UI section 39 receives the input and the flow proceeds to step S151.

In step S151, the CPU 101 determines the received print option and sets the print option. When the print option is determined to be printing to be checked by eye, the flow proceeds to step S152, and the CPU 101 determines that the paper ejection method of the color MFP 37 should be the face-up ejection method, stores the determined paper ejection method in the ROM 103. When the print option is determined to be confidential printing, the flow proceeds to step S153, and the CPU 101 determines that the paper ejection method of the color MFP 37 should be the face-down ejection method and stores the determined paper ejection method in the ROM 103. When the print option is determined to be speed-priority printing, the flow proceeds to step S154, and the CPU 101 determines that the paper ejection method of the color MFP 37 should be the face-down ejection method and stores the determined paper ejection method in the ROM 103. It is determined that the paper ejection method of the color MFP 37 for the case of speed-priority print option should be the face-down ejection method, since the processing speed of the color MFP 37 in the present embodiment is higher in the face-down ejection method; however, when the processing speed of the color MFP 37 is higher in the face-up ejection method, it is determined that the paper ejection method should be the face-up method. Printing to be checked by eye, confidential printing, and speed-priority printing have been shown as examples of print options in the present embodiment; however, when other print options are available, appropriate paper ejection methods may be determined in accordance with the set print options.

FIG. 12 is a flowchart showing the process of adding a job ticket in step S147 shown in FIG. 10.

When the process of adding a job ticket is started, the CPU 101 extracts the rendering data of the first page of the content pages 251 and stores the copy in step S160.

In step S161, the CPU 101 converts the ID information of a job to a barcode, and generates rendering data to be shown in the upper right portion of a page and add this data to the stored copy of the rendering data.

In step 162, the CPU 101 determines whether the determined paper ejection method of the color MFP 37 is the face-up or face-down ejection method. In the case of the face-up ejection method, the flow proceeds to step S163. In step S163, the CPU 101 places the job ticket 250, whose front surface includes the stored copy of the rendering data and whose back surface is a blank page, in front of the top page of the print job data and merges them.

When the paper ejection method is determined to be the face-down method in step S162, the flow proceeds to step S164. In step S164, the CPU 101 places the job ticket 250, whose front surface is a blank page and whose back surface includes the stored copy of the rendering data, after the last page of the print job data and merges them.

FIG. 13 is a flowchart for explaining the control processing of the nearline finisher 46 performed in the post-press server 40. The following processing steps are performed by the CPU of the post-press server 40.

In the finishing process, the job ID information and the paper ejection method are obtained from the client PC 31 and stored in step 170. In other words, the finishing control data 151 and 201 described using FIG. 6 or 7 are stored one by one, after being transmitted to the post-press server 40 via the client PC 31 whenever the color MFP 37 performs print processing.

In step S171, the printed media wait to be input to the nearline finisher 46. When the printed media are input, the flow proceeds to step S172, where the barcode of the job ticket 250 of the printed media is read and the job ID information of the printed media is obtained.

In step S173, data that corresponds to the job ID information of the input printed media is searched for among the already stored data including the finishing control data 151 and 201, and it is determined whether or not the corresponding data is found. When it is determined in step S173 that the corresponding finishing control data 151 and 201 exist, the flow proceeds to step S174, and when not, the flow proceeds to step S177, where an error handling process is performed and the post processing unit is controlled not to perform a finishing process.

In step S174, the paper ejection method used for ejecting the input printed media in the color MFP 37 is obtained from the corresponding finishing control data 151 and 201.

In step S175, the paper feeding method of the input printed media that is set in the nearline finisher 46 is compared with the paper ejection method of the color MFP 37 obtained in step S174 to check whether they match. When the comparison result shows that the paper feeding method of the nearline finisher 46 matches the paper ejection method of the color MFP 37, the flow proceeds to step S176. In step S176, the post processing unit of the nearline finisher 46 is controlled to perform a finishing process in accordance with the finishing instruction data of the finishing control data 151 and 201.

When the comparison result in step S175 shows that the paper feeding method of the nearline finisher 46 does not match the paper ejection method of the color MFP 37, the flow proceeds to step S178. In step S178, it is determined whether or not the setting of the paper feeding method of the nearline finisher 46 can be changed to the paper feeding method that matches the paper ejection method of the color MFP 37. When it is determined that the setting can be changed, the flow proceeds to step S179, where an alert is issued so as to prompt an operator to change the paper feeding method of the nearline finisher 46. When the setting cannot be changed, the flow proceeds to step S177, where an error handling process is performed and the post processing unit is controlled not to perform a finishing process.

In step S180, it is determined whether or not the paper feeding method of the nearline finisher 46 has been changed. When it has been changed, the flow proceeds to step S175, where the paper feeding method of the nearline finisher 46 is again compared with the paper ejection method of the color MFP 37. When the paper feeding method of the nearline finisher 46 has not been changed, the flow proceeds to step S177, where an error handling process is performed and the post processing unit is controlled not to perform a finishing process.

By controlling the printing system in accordance with the flowcharts shown in FIGS. 10 to 13, a finishing process can be performed while the paper feeding method of the nearline finisher 46 is made to be the same as the paper ejection method of the color MFP 37. Hence, performing a wrong finishing process for printed media can be prevented.

It is assumed that an operation to change the paper feeding method in the nearline finisher 46 according to the present embodiment is performed physically and by an operator; however, the nearline finisher 46 may be configured so as to allow the paper feeding method to be electrically changed. In this case, the CPU of the post-press server 40 can change the paper feeding method of the nearline finisher 46 so as to match the paper ejection method of the color MFP 37, when the comparison result in step S175 shows that they do not match.

Hereinafter, as a second embodiment, a detailed description is made with reference to the attached drawings, of processing in which a paper ejection method of the printed media in the color MFP 37 is added to a job ticket and the job ticket is printed such that it can be checked by eye by an operator. The second embodiment allows an operator to easily set a paper feeding method that is appropriate for application to the printed media, on the basis of his or her own decision when setting the paper feeding method in the nearline finisher 46.

A printing system similar to that in the first embodiment is also used in the second embodiment as a printing system to which the present invention is applied. The ROM 103 contains a program corresponding to flowcharts shown in FIGS. 15 and 16 described later. The flows of steps of the flowcharts shown in FIGS. 15 and 16 are realized such that the CPU 101 reads and executes a program stored in the ROM 103 and causes the JDF handler 38 to operate.

Figure 14:
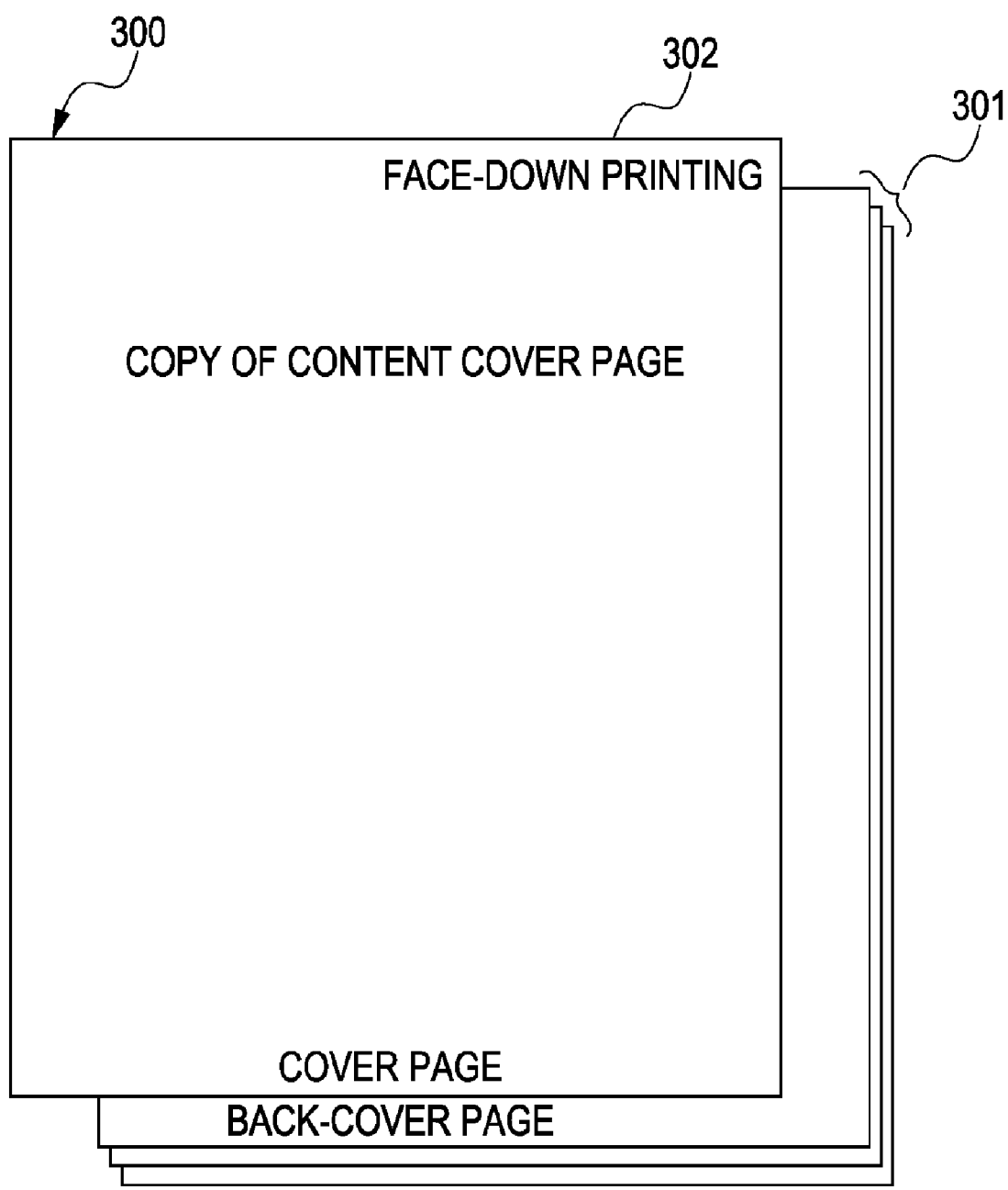
FIG. 14 is a diagram for explaining a job ticket having visible information according to a second embodiment of the invention.

FIG. 14 is a diagram for explaining an example job ticket to which a paper ejection method of the color MFP 37 in the second embodiment of the present invention is added in a visible state. The uppermost page of the stacked printed media is a job ticket 300, and is followed by content pages 301. The job ticket 300 includes a copy of the first page of the content pages 301 and a paper ejection method 302 of the color MFP 37 printed at the top end thereof in a visible state. This is an example for the case in which the paper ejection method of the color MFP 37 is the face-down ejection method. Hence, the back surface of the last page of the content pages 301 is printed as a page immediately following the job ticket 300, which is the uppermost page of the printed media, and the front surface of the first page of the content pages 301 is printed facing downward at the bottom of the printed media. When the paper ejection method of the color MFP 37 is the face-up ejection method, the first page of the content pages 301 is printed as a page immediately following the job ticket 300, which is the uppermost page of the printed media.

Figure 15:
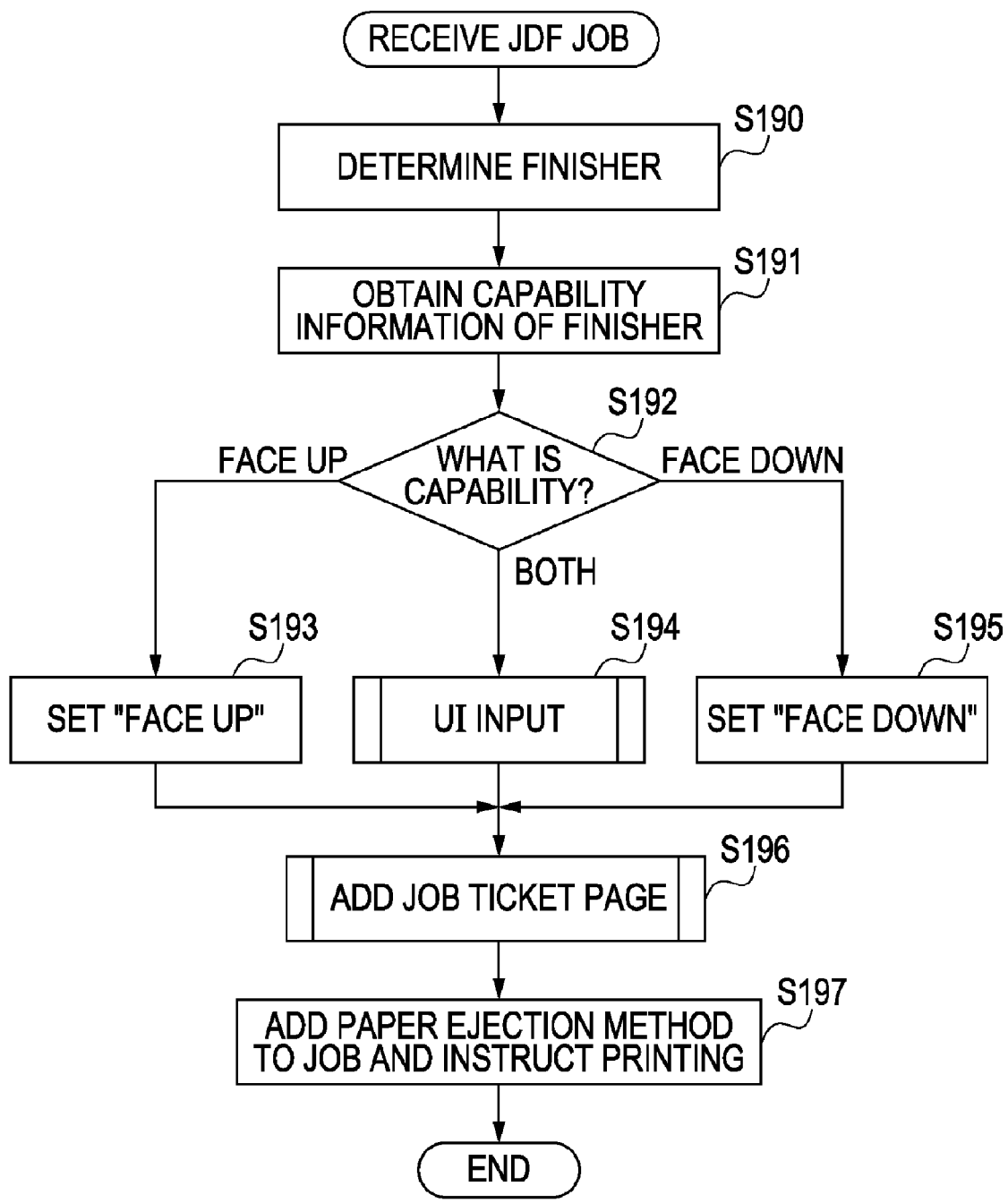
FIG. 15 is a first flowchart for explaining processing according to the second embodiment.
Figure 16:
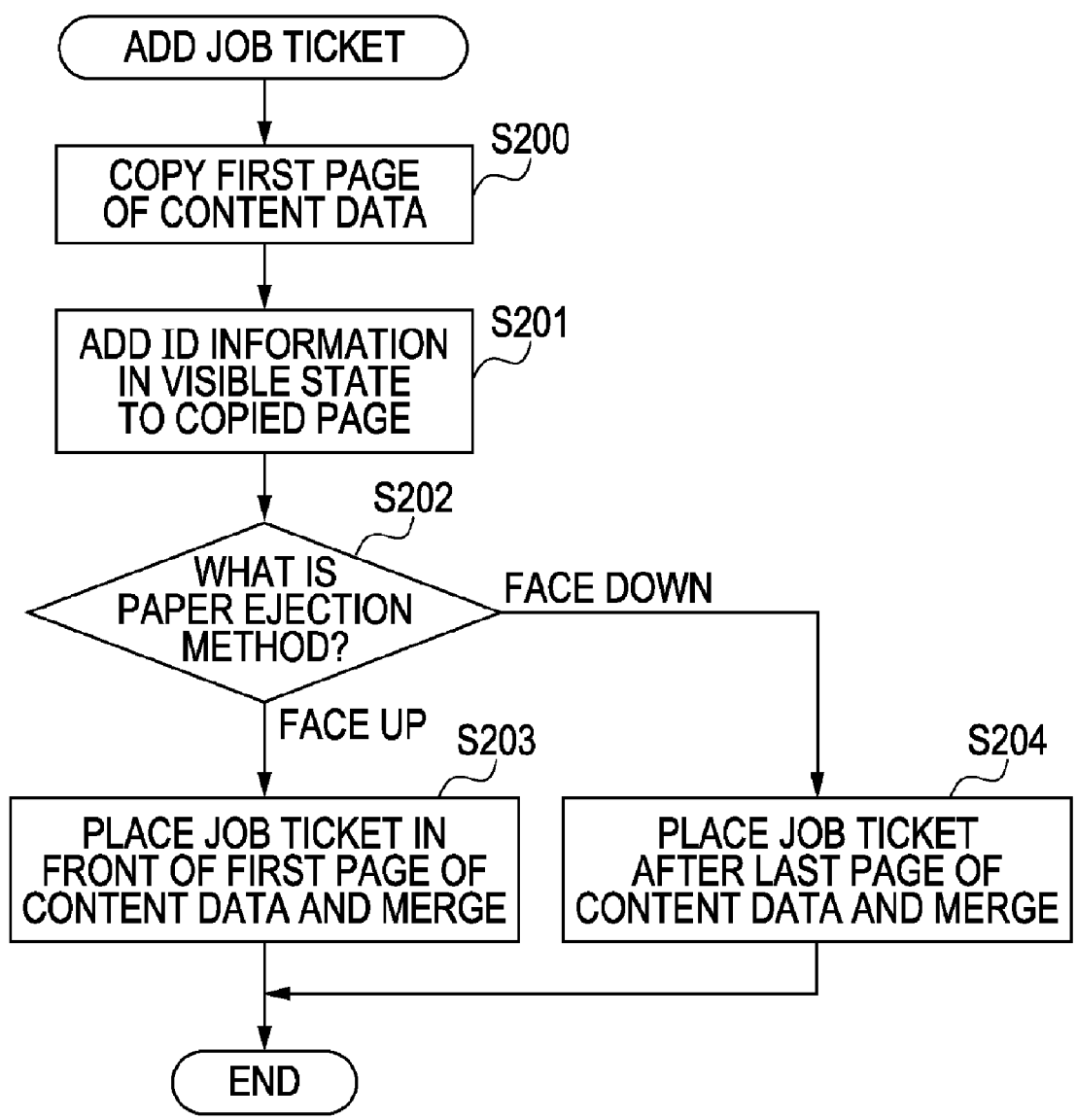
FIG. 16 is a second flowchart for explaining processing according to the second embodiment.

Referring to FIGS. 15 and 14, the operation of the present embodiment will be described. FIG. 15 is a flowchart for explaining processing in which the CPU 101 determines the paper ejection method of the color MFP 37 using the JDF handler 38, and reflects the determined paper ejection method in the job ticket 300.

When the client PC 31 receives a job from the MIS server 20, the CPU 101 determines, in step S190, that the nearline finisher 46 is the finisher to be used, by making an inquiry to the post-press server 40 on the basis of the finishing process specified by the job.

In step S191, the CPU 101 obtains, via the post-press server 40, capability information showing the paper feeding method that is supported by the nearline finisher 46 identified in step S190. A configuration using a table may be also used in this case as in the first embodiment.

In step S192, the CPU 101 determines the capability shown in the received information. When it is determined that the nearline finisher 46 supports only the face-up paper feeding method, the flow proceeds to step S193. In step S193, the CPU 101 determines that the paper ejection method of the color MFP 37 should be the face-up ejection method, and stores the determined paper ejection method in the ROM 103.

When it is determined that the nearline finisher 46 supports both face-up and face-down paper feeding methods in step S192, the flow proceeds to step S194.

In step S194, the UI section 39 stores in the ROM 103 the paper ejection method of the color MFP 37 that is determined by the CPU 101 on the basis of the input information entered at the selection screen 1300 regarding the print options. Alternatively, the print option may be set in advance.

When it is determined in step S192 that the nearline finisher 46 supports only the face-down paper feeding method, the flow proceeds to step S195. Then, the CPU 101 determines that the paper ejection method of the color MFP 37 should be the face-down ejection method, and stores the determined paper ejection method in the ROM 103.

In step S196, the process of adding a job ticket is performed, as will be described later using FIG. 16.

In step S197, the CPU 101 makes the determined paper ejection method of the color MFP 37 be included in the print job data, and performs control such that the print unit of the color MFP 37 performs printing and the paper ejecting unit 10 ejects paper using the determined paper ejection method.

FIG. 16 is a flowchart showing the process of adding a job ticket performed in step S196 shown in FIG. 15.

When the process of adding a job ticket is started, the CPU 101 extracts the rendering data of the first page of the content pages 301 and stores the copy in step S200.

In step S201, the CPU 101 generates rendering data for a character string, to be shown in the upper right portion of a page, representing the paper ejection method of the color MFP 37, and adds this data to the copy of the rendering data stored in step S200.

In step S202, the CPU 101 determines whether the determined paper ejection method of the color MFP 37 is the face-up or face-down ejection method. In the case of the face-up ejection method, the flow proceeds to step S203. In step S203, the CPU 101 places the job ticket 300, whose front surface includes the stored copy of the rendering data and whose back surface is a blank page, in front of the first page of the content pages 301 and merges them.

When the paper ejection method of the color MFP 37 is determined to be the face-down ejection method in step S202, the flow proceeds to step S204. In step S204, the CPU 101 places the job ticket 300, whose front surface is a blank page and whose back surface includes the stored copy of the rendering data, after the last page of the content pages 301 and merges them.

By performing control in accordance with the flowcharts shown in FIGS. 15 and 16, as described above, the job ticket 300, which includes the paper ejection method of the color MFP 37 printed in a visible state, is ejected so as to be placed on top of the stacked printed media. Hence, an operator can reliably obtain the printed job ticket 300 irrespective of the paper ejection method of the color MFP 37.

Hereinafter, as a third embodiment, a detailed description is made with reference to the attached drawings, of the process, according to an embodiment, of printing a job ticket in which a paper ejection method of the printed media in the color MFP 37 is added to a job ticket, in the form of a barcode. The third embodiment allows the nearline finisher 46 to obtain the paper ejection method of the color MFP 37 by reading the barcode of a job ticket at the time of the input of printed media, thereby realizing setting of a paper feeding method that matches the paper ejection method obtained.

A printing system similar to that in the first embodiment is also used in the third embodiment as a printing system to which the present invention is applied. The ROM 103 contains a program corresponding to a flowchart shown in FIG. 18 described later. The flow of steps of the flowchart shown in FIG. 18 is realized such that the CPU reads and executes a program stored in the ROM 103 and causes the JDF handler 38 to operate.

Figure 17:
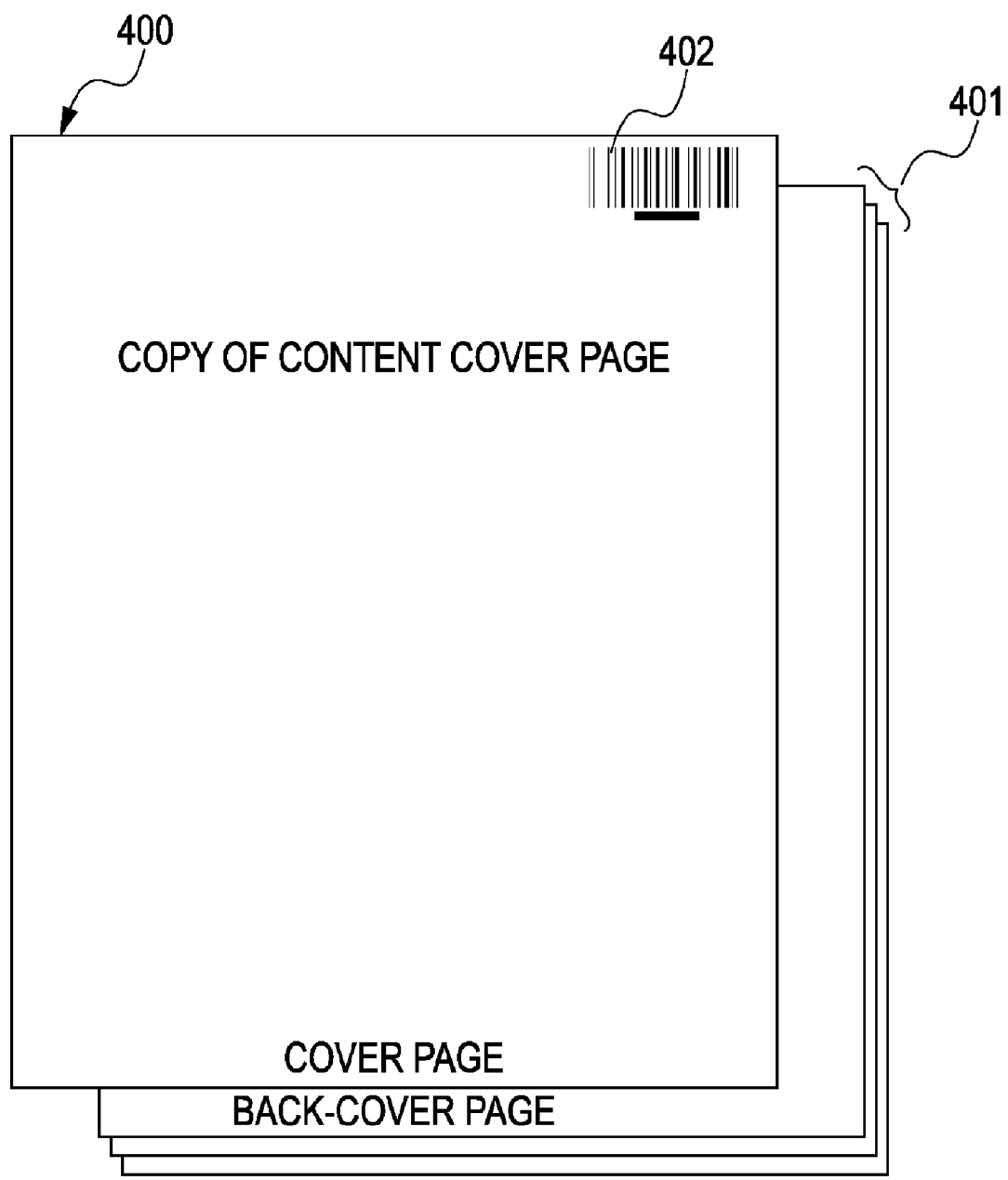
FIG. 17 is a diagram for explaining a job ticket having a barcode representing information according to a third embodiment of the invention.

FIG. 17 is a diagram for explaining an example job ticket to which information of a paper ejection method of the color MFP 37 in the third embodiment of the present invention is added in the form of a barcode. The uppermost page of the stacked printed media is a job ticket 400, and is followed by content pages 401. The job ticket 400 includes a copy of the first page of the content pages 401 and a barcode representing the paper ejection method of the color MFP 37 printed at the top end thereof. This is an example for the case in which the paper ejection method of the color MFP 37 is the face-down ejection method. Hence, the back surface of the last page of the content pages 401 is printed as a page immediately following the job ticket 400, which is the uppermost page of the printed media, and the front surface of the first page of the content pages 401 is printed facing downward at the bottom of the printed media. When the paper ejection method of the color MFP 37 is the face-up ejection method, the first page of the content pages 401 is printed as a page immediately following the job ticket 400, which is the uppermost page of the printed media.

Figure 18:
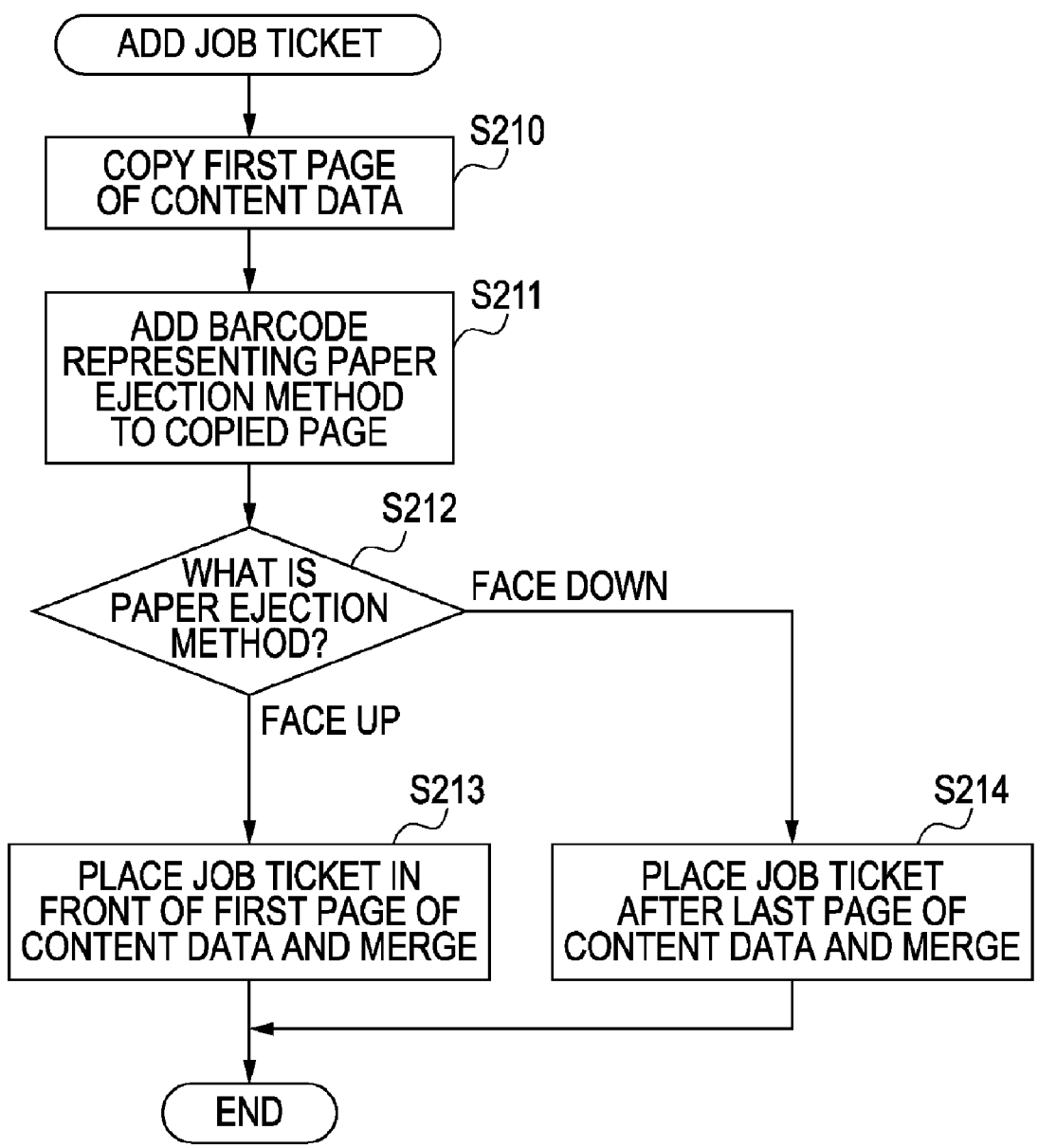
FIG. 18 is a flowchart for explaining processing according to the third embodiment.

FIG. 18 is a flowchart showing the process of adding a job ticket in step S196 shown in FIG. 15.

When the process of adding a job ticket is started, the CPU 101 extracts the rendering data of the first page of the content pages 401 and stores the copy in step S210.

In step S211, the CPU 101 generates rendering data for a barcode 402, to be shown at the upper right portion of a page, representing the paper ejection method of the color MFP 37, and adds this data to the copy of the rendering data stored in step S210.

In step S212, the CPU 101 determines whether the determined paper ejection method of the color MFP 37 is the face-up or face-down ejection method. In the case of the face-up ejection method, the flow proceeds to step S213. In step S213, the CPU 101 places the job ticket 400, whose front surface includes the stored copy of the rendering data and whose back surface is a blank page, in front of the first page of the print job data and merges them.

When the paper ejection method of the color MFP 37 is determined to be the face-down ejection method in step S212, the flow proceeds to step S214. In step S214, the CPU 101 places the job ticket 400, whose front surface is a blank page and whose back surface includes the stored copy of the rendering data, after the last page of the content pages 401 and merges them.

By performing control in accordance with the flowchart shown in FIG. 18, as described above, the paper feeding method of the nearline finisher 46 is caused to be the same as the paper ejection method of the color MFP 37 on the basis of the barcode information. Hence, a finishing process is prevented from being performed when the paper feeding method of the nearline finisher 46 does not match the paper ejection method of the color MFP 37.

Note that a barcode is used for showing the paper ejection method of a job in the present embodiment; however, not limited to a barcode, any method capable of adding information to a paper medium, such as QR Code and LVBC, may be used.

In addition, a configuration may be used in which, after the nearline finisher 46 has read the barcode 402, a paper feeding method that matches the paper ejection method read from the barcode 402 is automatically set in the nearline finisher 46 under the control of the CPU of the post-press server 40.

In each of the embodiments described above, the JDF handler 38 is used as software for controlling the entirety of processing, and a job concerning printing is handled in the form of a JDF job; however, the present invention may be applied to any other form of a print job, not limited to JDF.

The computer-readable storage medium in each of the embodiments described above may be any computer-readable storage medium capable of storing data such as a hard disk drive (HDD) or a random access memory (RAM).

Furthermore, the functions of the embodiments may be realized by making a computer read out and execute program codes stored in a computer-readable storage medium that realizes the steps of the flowcharts shown in the embodiments described above. In this case, the functions of the embodiments described above are realized by the program codes themselves read out from a computer-readable storage medium. Hence, the program codes and the computer-readable storage medium that stores the program codes can configure the present invention.

Examples of computer readable storage media used for providing the program codes include a floppy (registered trademark) disk, a hard disk, an optical disk, a magneto-optical disk, a CD-ROM, a CD-R, a magnetic tape, a non-volatile memory card, and a ROM.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-122392 filed May 8, 2008, which is hereby incorporated by reference herein in its entirety.

What is claimed is:

1. A print control apparatus that controls an image forming apparatus and a post-press section,
wherein the image forming apparatus includes a print unit configured to perform printing and a paper ejecting unit configured to eject printed media printed by the print unit, and
wherein the post-press section includes a finisher apparatus and a finisher control apparatus that controls the finisher apparatus, the finisher apparatus including a paper feeding unit configured to feed printed media and a post processing unit configured to perform post processing on the printed media fed by the feeding unit,
the print control apparatus comprising:
an obtaining unit configured to obtain capability information showing a paper feeding method supported by the paper feeding unit of the finisher apparatus;
a determination unit configured to determine a paper ejection method of the paper ejecting unit of the image forming apparatus on the basis of the capability information obtained by the obtaining unit; and
a control unit configured to control the print unit of the image forming apparatus such that content included in a job is printed together with a job ticket that includes information regarding the job, and configured to control the paper ejecting unit of the image forming apparatus such that paper is ejected using the paper ejection method determined by the determination unit,
wherein the control unit controls the print unit of the image forming apparatus such that the information regarding the job is printed on the upper surface of the job ticket and controls the paper ejecting unit of the image forming apparatus such that, in a state in which the printed media are stacked, the job ticket is ejected so as to be placed on top of printed media on which the content has been printed.

2. The print control apparatus according to claim 1, wherein the control unit controls the print unit of the image forming apparatus such that, when the paper ejection method determined by the determination unit is a face-up ejection method, information showing the paper ejection method is printed on the front surface of the job ticket after printing of the job, and, when the paper ejection method determined by the determination unit is a face-down ejection method, information showing the paper ejection method is printed on the back surface of the job ticket after printing of the job.

3. The print control apparatus according to claim 2, wherein the control unit, when the paper ejection method determined by the determination unit is the face-up ejection method, causes the job ticket that includes the information showing the paper ejection method on the front surface of the job ticket to be placed on the first page of the content included in the job, and when the paper ejection method determined by the determination unit is the face-down ejection method, causes the job ticket that includes the information showing the paper ejection method on the back surface of the job ticket to be placed on the last page of the content included in the job.

4. The print control apparatus according to claim 1, wherein the determination unit determines the paper ejection method on the basis of a print option of the job.

5. The print control apparatus according to claim 4, wherein the print option includes at least one of confidential printing, printing to be checked by eye, and speed-priority printing.

6. The print control apparatus according to claim 1, wherein the job ticket includes an image of a first page of the content included in the job.

7. A print control apparatus that controls an image forming apparatus and a post-press section, wherein the image forming apparatus includes a print unit configured to perform printing and a paper ejecting unit configured to eject printed media printed by the print unit, and wherein the post-press section includes a finisher apparatus and a finisher control apparatus that controls the finisher apparatus, the finisher apparatus including a paper feeding unit configured to feed printed media and a post processing unit configured to perform post processing on the printed media fed by the feeding unit, the print control apparatus comprising:

an obtaining unit configured to obtain capability information showing a paper feeding method supported by the paper feeding unit of the finisher apparatus;

a determination unit configured to determine a paper ejection method of the paper ejecting unit of the image forming apparatus on the basis of the capability information obtained by the obtaining unit; and a control unit configured to control the print unit of the image forming apparatus such that content included in a job is printed together with a job ticket that includes information showing the paper ejection method determined by the determination unit, and configured to control the paper ejecting unit of the image forming apparatus such that paper is ejected using the paper ejection method determined by the determination unit.

8. The print control apparatus according to claim 7, wherein the control unit controls the print unit of the image forming apparatus such that the information showing the paper ejection method is printed on the upper surface of the job ticket, and controls the paper ejecting unit of the image forming apparatus such that, in a state in which the printed media are stacked, the job ticket is ejected so as to be placed on top of the printed media on which the content has been printed.

9. A printing system that includes an image forming apparatus, a post-press section, and a print control apparatus that controls the image forming apparatus and the post-press section, wherein the image forming apparatus includes a print unit configured to perform printing and a paper ejecting unit configured to eject printed media printed by the print unit, and wherein the post-press section includes a finisher apparatus and a finisher control apparatus that controls the finisher apparatus, the finisher apparatus including a paper feeding unit configured to feed printed media and a post processing unit configured to perform post processing on the printed media fed by the feeding unit, the print control apparatus comprising:

an obtaining unit configured to obtain capability information showing a paper feeding method supported by the paper feeding unit of the finisher apparatus;

a determination unit configured to determine a paper ejection method of the paper ejecting unit of the image forming apparatus on the basis of the capability information obtained by the obtaining unit;

a notification unit configured to notify the post-press section of the paper ejection method determined by the determination unit in association with identification information of a job; and a control unit configured to control the print unit of the image forming apparatus such that content included in the job is printed together with a job ticket that includes the identification information, and configured to control the paper ejecting unit of the image forming apparatus such that paper is ejected using the paper ejection method determined by the determination unit, wherein the post-press section includes a search unit configured to search for identification information that matches the identification information included in the job ticket among identification information received from the notification unit when the paper feeding unit feeds the printed media;

a comparison unit configured to compare a paper feeding method of the paper feeding unit of the finisher apparatus with a feeding method associated with the identification information found by the search unit; and a finisher control unit configured to control the post processing unit such that the post processing is performed when the paper ejection method matches the paper feeding method from the result of the comparison by the comparison unit, and the post processing is not performed when the paper ejection method does not match the paper feeding method from the result of the comparison by the comparison unit.

10. The printing system according to claim 9, wherein the control unit controls an alert unit such that an alert is issued to prompt changing of the paper feeding method of the paper feeding unit of the finisher apparatus when the paper feeding method does not match the paper ejection method from the result of the comparison by the comparison unit.

11. The printing system according to claim 9, wherein the control unit controls a changing unit such that the paper feeding method of the paper feeding unit of the finisher apparatus is changed when the paper feeding method does not match the paper ejection method from the result of the comparison by the comparison unit.

12. A print control method that controls an image forming apparatus and a post-press section, wherein the image forming apparatus performs printing and ejects printed media, and the post-press section includes a finisher apparatus that feeds the printed media and performs post processing on the printed media and a finisher control apparatus that controls the finisher apparatus, the print control method comprising the steps of:

obtaining capability information showing a paper feeding method supported by the paper feeding unit of the finisher apparatus; and determining a paper ejection method of the image forming apparatus on the basis of the capability information obtained in the obtaining step, wherein the image forming apparatus is controlled to perform processing based on a job, to print content included in the job together with a job ticket including information regarding the job, to print the information regarding the job on the upper surface of the job ticket, and to eject the job ticket using the paper ejection method determined in the determining step, in a state in which the printed media are stacked, so as to be placed on top of the printed media on which the content has been printed.

13. A non-transitory computer readable storage medium storing a program for causing a computer to execute the print control method according to claim 12.

14. A print control method that controls an image forming apparatus and a post-press section, wherein the image forming apparatus performs printing and ejects printed media, and the post-press section includes a finisher apparatus that feeds printed media and performs post processing on the printed media and a finisher control apparatus that controls the finisher apparatus, the print control method comprising the steps of:

obtaining capability information showing a paper feeding method supported by the paper feeding unit of the finisher apparatus; and determining a paper ejection method of the image forming apparatus on the basis of the capability information obtained in the obtaining step, wherein the image forming apparatus is controlled to perform processing based on a job, to print content included in the job together with a job ticket including information showing the paper ejection method determined by the determination unit, and to eject paper using the paper ejection method determined in the determining step.

15. A non-transitory computer readable storage medium storing a program for causing a computer to execute the print control method according to claim 14.

16. A print control method that controls a printing system including an image forming apparatus, a post-press section, and a print control apparatus that controls the image forming apparatus and the post-press section, wherein the image forming apparatus performs printing and ejects printed media, and the post-press section includes a finisher apparatus that feeds the printed media and performs post processing on the printed media and a finisher control apparatus that controls the finisher apparatus, the print control method comprising the steps of:

obtaining capability information showing a paper feeding method supported by the paper feeding unit of the finisher apparatus;

determining a paper ejection method of the image forming apparatus on the basis of the capability information obtained in the obtaining step;

notifying the post-press section of the paper ejection method determined in the determining step in association with identification information of a job;

controlling the image forming apparatus such that processing is performed on the basis of the job, content included in the job is printed together with a job ticket that includes the identification information, and paper is ejected using the paper ejection method determined in the determining step;

searching for identification information that matches the identification information printed on the job ticket among identification information received in the notifying step when the finisher apparatus feeds the printed media; and comparing a paper feeding method of the finisher apparatus with a feeding method associated with the identification information found in the searching step, wherein the finisher apparatus is controlled to perform the post processing when the paper ejection method matches the paper feeding method from the result of the comparison performed in the comparing step, and not to perform the post processing when the paper ejection method does not match the paper feeding method from the result of the comparison performed in the comparing step.

17. A non transitory computer readable storage medium storing a program for causing a computer to execute the print control method according to claim 16.

* * * * *